(12) United States Patent
Seto

(10) Patent No.: US 10,733,920 B2
(45) Date of Patent: Aug. 4, 2020

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hidekazu Seto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/794,675

(22) Filed: Oct. 26, 2017

(65) Prior Publication Data

US 2018/0130390 A1 May 10, 2018

(30) Foreign Application Priority Data

Nov. 9, 2016 (JP) .................................. 2016-218954

(51) Int. Cl.
*G09G 3/00* (2006.01)
*H04N 1/00* (2006.01)
*G09G 5/00* (2006.01)
*H04N 1/32* (2006.01)
*H04N 1/327* (2006.01)

(52) U.S. Cl.
CPC ............ *G09G 3/002* (2013.01); *G09G 5/003* (2013.01); *H04N 1/00251* (2013.01); *H04N 1/00381* (2013.01); *H04N 1/32122* (2013.01); *H04N 1/32771* (2013.01); *H04N 2201/0082* (2013.01); *H04N 2201/3205* (2013.01); *H04N 2201/3228* (2013.01); *H04N 2201/3253* (2013.01); *H04N 2201/3269* (2013.01); *H04N 2201/3273* (2013.01)

(58) Field of Classification Search
CPC .................................................. H04N 1/00251
See application file for complete search history.

(56) References Cited

U.S. PATENT DOCUMENTS

2012/0068812 A1* 3/2012 Yamamoto ............... G06K 7/00
340/5.1
2015/0317784 A1 11/2015 Oshima
2017/0171521 A1* 6/2017 Jung ..................... H04N 9/3194

FOREIGN PATENT DOCUMENTS

JP          2015-212898 A     11/2015

* cited by examiner

*Primary Examiner* — Jefferey F Harold
*Assistant Examiner* — Justin B Sanders
(74) *Attorney, Agent, or Firm* — Canon U.S.A., Inc. IP Division

(57) ABSTRACT

A camera scanner captures an image of a document stand on which an object is placed using a camera unit. The camera scanner obtains an IP address of an electronic terminal (a smartphone) and an identifier of an image from the image of a display screen of the electronic terminal placed on the document stand by detecting and decoding a QR code. The camera scanner is connected to the electronic terminal based on the IP address, transmits a data transfer request including the identifier of the image to the electronic terminal, and receives image data transferred from the electronic terminal in response to the data transfer request. Then the camera scanner projects and plays an image generated based on the data transferred from the electronic terminal on the document stand using a projector.

20 Claims, 23 Drawing Sheets

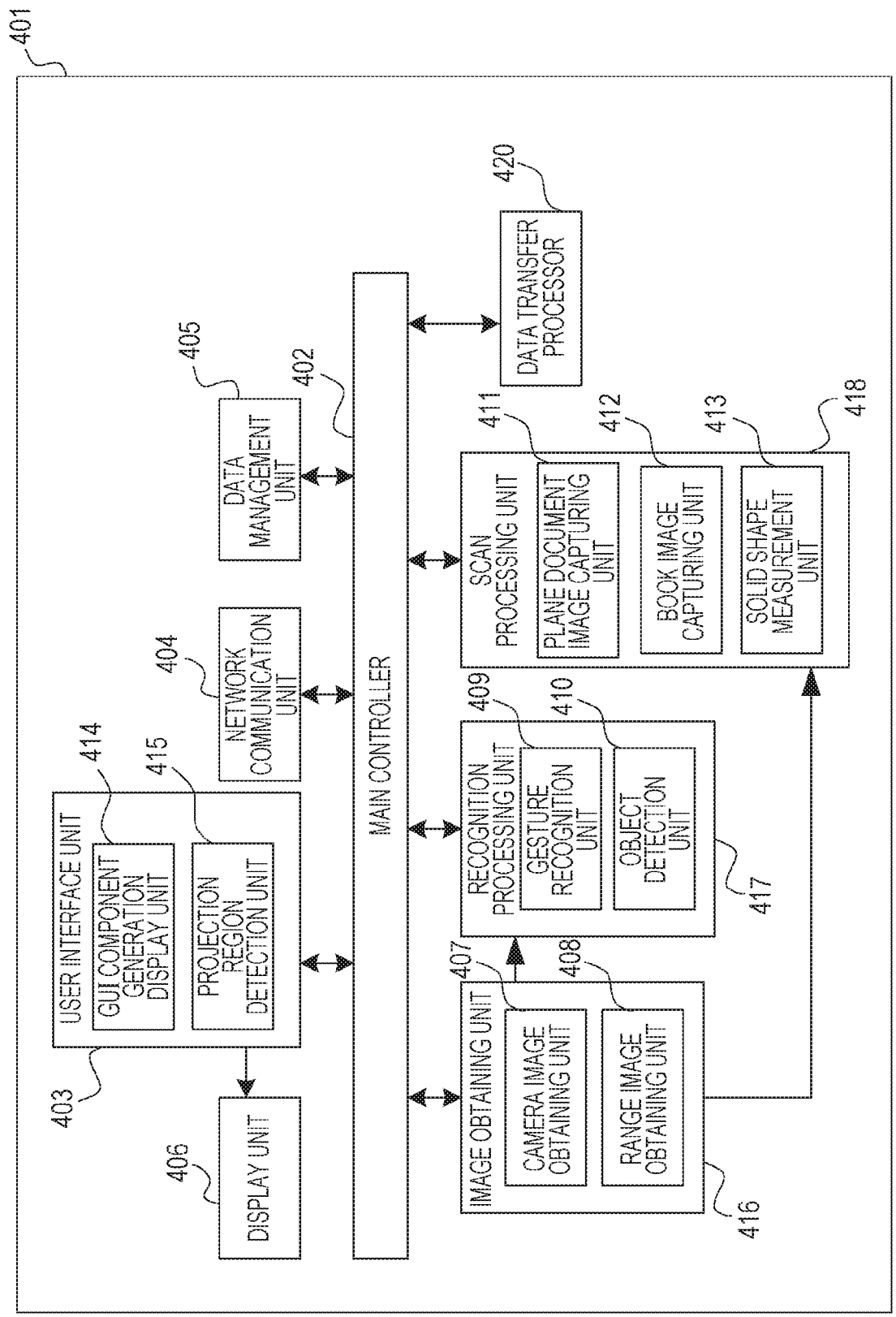

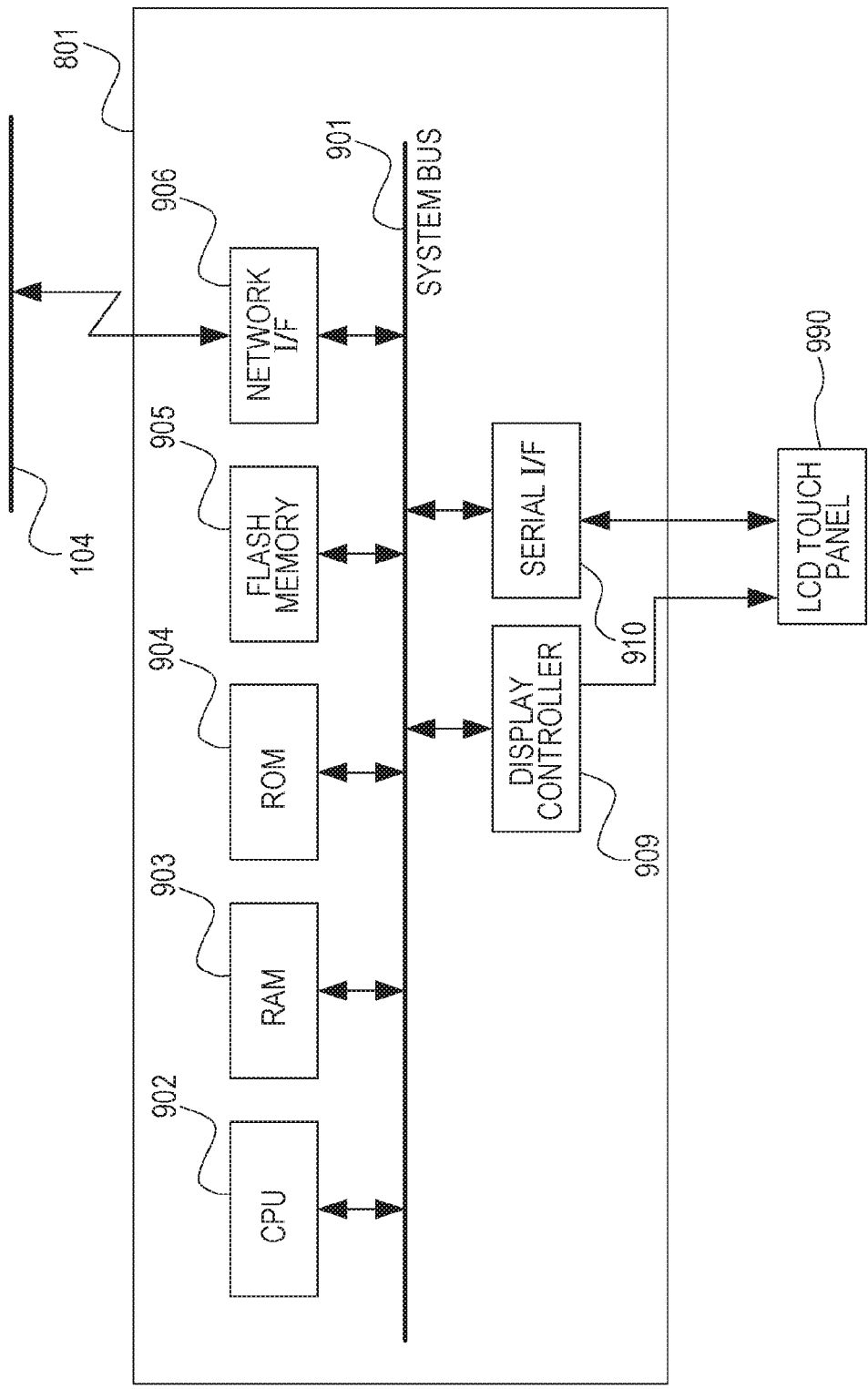

IMAGE PROCESSING APPARATUS, METHOD FOR CONTROLLING THE SAME, AND STORAGE MEDIUM

BACKGROUND

Field of the Disclosure

The present disclosure relates to an image processing apparatus which performs display based on data transferred from an electronic terminal, a method for controlling the image processing apparatus, and a storage medium.

Description of the Related Art

In general, a technique associated with a projector and a camera scanner which has a user interface and which uses a camera and a distance image sensor has been disclosed. For example, in a technique disclosed in Japanese Patent Laid-Open No. 2015-212898, a user interface is displayed on a real object, such as a sheet, in an overlapping manner by projection display performed by a projector. Therefore, a user may use the real object as an interface with electronic data.

According to such a technique, in an operation using both a paper document and electronic data, improvement of operation efficiency is expected. In a case where this technique is applied to support an operation, performed by a salesperson, of making a description for a customer using paper (a face-to-face operation), when the salesperson traces a portion to be emphasized on a physical paper document for the customer with a finger, a red line, for example, may be displayed in an overlapping manner. In general, a sheet is required to be scanned once before being computerized, and therefore, effective support of the face-to-face operation is realized when this technique is used.

However, the technique described above only simulates an operation target which does not include electronic data, such as paper. Here, if an image based on data displayed in an electronic terminal, such as a tablet terminal or a smartphone, is projected and displayed by a projector of a camera scanner, support of the face-to-face operation using a larger screen may become available. However, in the technique described above, projection and display of data displayed in the electronic terminal may not be easily performed by the projector of the camera scanner.

SUMMARY

According to some embodiments, an image processing apparatus includes an imaging unit configured to capture a document stand on which an object is placed, a memory device configured to store a set of instructions, and at least one processor configured to execute instructions to detect an encoded image generated by a predetermined encoding method in an image of a display screen of an electronic terminal placed on the document stand which is captured by the imaging unit, obtain connection information for connection to the electronic terminal and an identifier of data transferred from the electronic terminal by performing a decoding process on the detected encoded image, make a connection to the electronic terminal using the connection information, transmit a data transfer request including the identifier to the electronic terminal, receive data transferred from the electronic terminal in response to the data transfer request, and project an image generated based on the data transferred from the electronic terminal on the document stand by controlling a projection unit.

Further features of various embodiments will become apparent from the following description of exemplary embodiments with reference to the attached drawings.

BRIEF DESCRIPTION OF THE DRAWINGS

FIGS. 4A and 4B are diagrams illustrating a functional block configuration and a control sequence of the camera scanner, respectively.

FIG. 6 is a diagram illustrating a hardware configuration of a controller unit of a smartphone.

DESCRIPTION OF THE EMBODIMENTS

Hereinafter, embodiments of the present disclosure will be described with reference to the accompanying drawings.

First Embodiment

Figure 1:
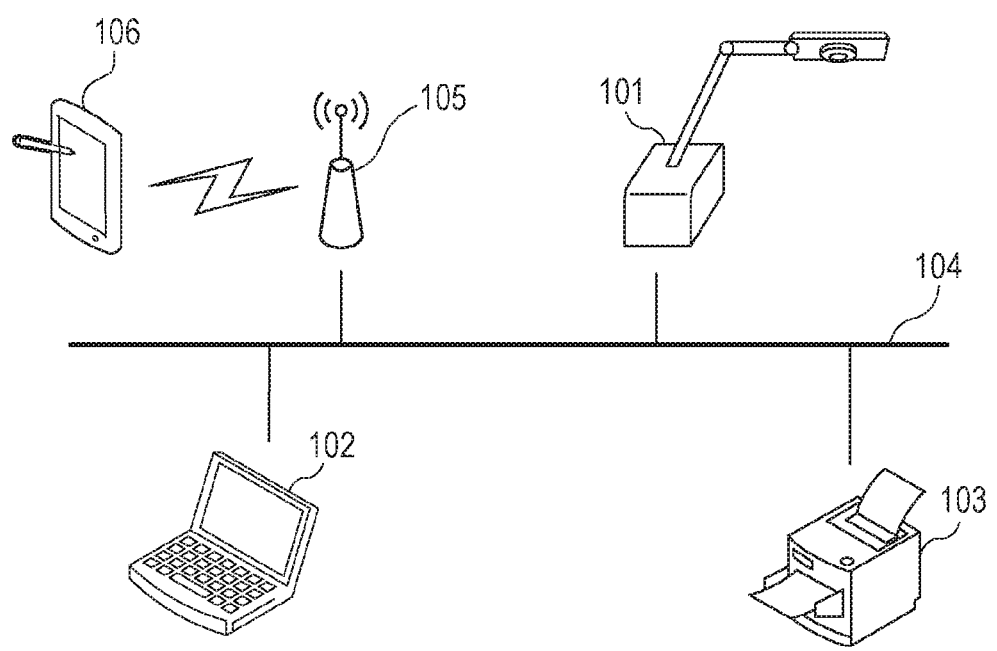
FIG. 1 is a diagram schematically illustrating a network configuration of a camera scanner.

FIG. 1 is a diagram illustrating a network configuration of a camera scanner 101 according to a first embodiment.

As illustrated in FIG. 1, the camera scanner 101 includes a host computer 102, a printer 103, and a wireless access point 105 through a network 104, such as Ethernet. Furthermore, the camera scanner 101 is connectable to a smartphone 106, which is an example of an electronic terminal, through the wireless access point 105. In the network configuration of FIG. 1, a scan function of the camera scanner 101 of reading an image in response to an instruction issued by the host computer 102 and a print function of the printer 103 of outputting scan data obtained by the reading may be executed. Furthermore, in the network configuration of FIG. 1, the scan function and the print function may be executed by issuing a direct, instruction to the camera scanner 101 without using the host computer 102. Furthermore, the camera scanner 101 and the smartphone 106 may perform socket communication with each other in accordance with TCP/IP.

Configuration of Camera Scanner

Figure 2A:
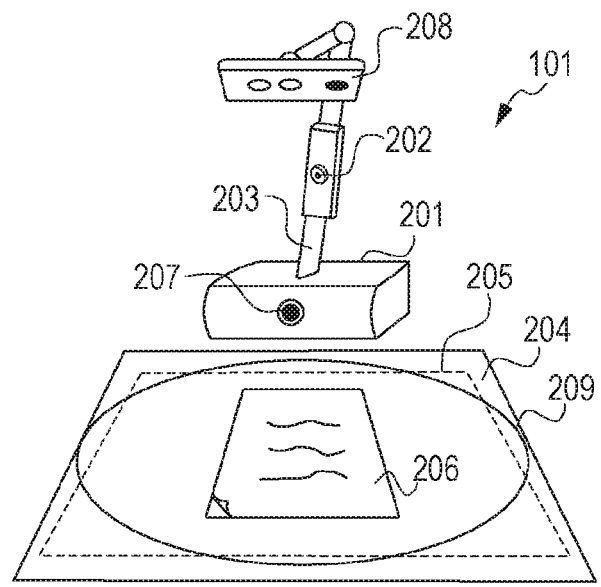
FIGS. 2A to 2C are diagrams schematically illustrating the appearance of the camera scanner.
Figure 2B:
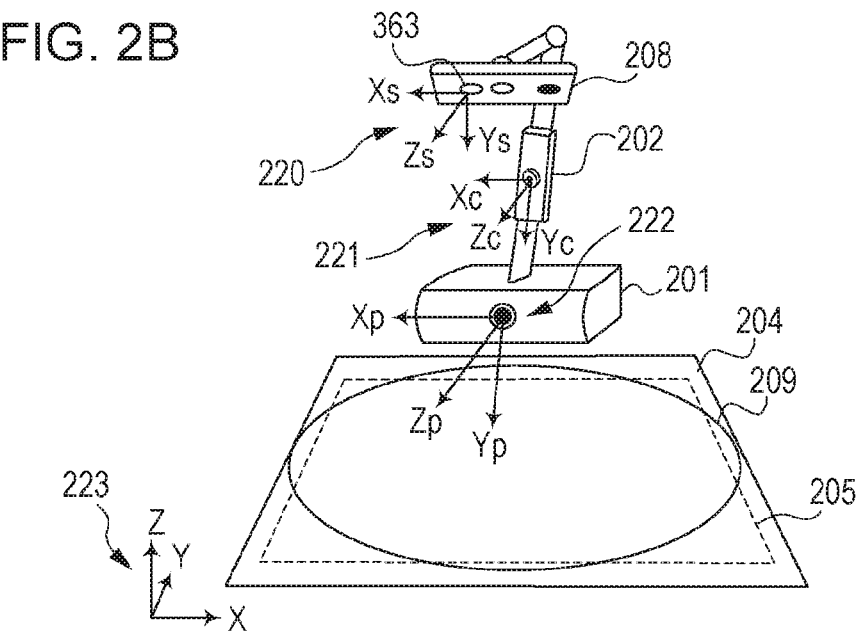

FIGS. 2A and 2B are diagrams schematically illustrating a configuration of the camera scanner 101, which is an example of a data transfer apparatus in this embodiment.

As illustrated in FIG. 2A, the camera scanner 101 includes a controller unit 201, a camera unit 202, an arm unit 203, a short focus projector 207 (hereinafter referred to as a "projector 207"), and a range image sensor unit 208. The controller unit 201, which is a main body of the camera scanner 101; the camera unit 202, which performs imaging; the projector 207; and the range image sensor unit 208 are connected to one another through the arm unit 203. The arm unit 203 may be bent and stretched using a joint.

Furthermore, a document stand 204 on which the camera scanner 101 is mounted is also illustrated in FIG. 2A. A lens of the camera unit 202 and a lens of the range image sensor unit 208 are directed to the document stand 204. The camera unit 202 captures an image of a reading region 205 surrounded by a dotted line in FIG. 2A so as to read an image of an object, a document, or the like placed on the reading region 205. The range image sensor unit 208 projects a certain pattern image in the reading region 205 and captures the pattern image so as to obtain a range image. In the example of FIG. 2A, a document 206 is included in the reading region 205, and therefore, the camera scanner 101 may read the document 206. Furthermore, a turntable 209 is disposed on the document stand 204. The turntable 209 is rotatable in accordance with an instruction issued by the controller unit 201. An object placed on the turntable 209 may be rotated by rotating the turntable 209, as viewed from the camera unit 202.

Note that, although the camera unit 202 may capture an image in only a single resolution, the camera unit 202 may be capable of performing high-resolution image capturing and low-resolution image capturing.

Figure 2C:
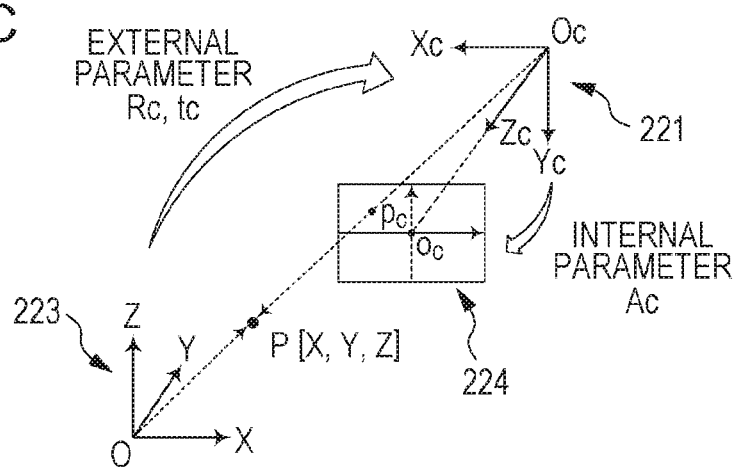
Figure 3:
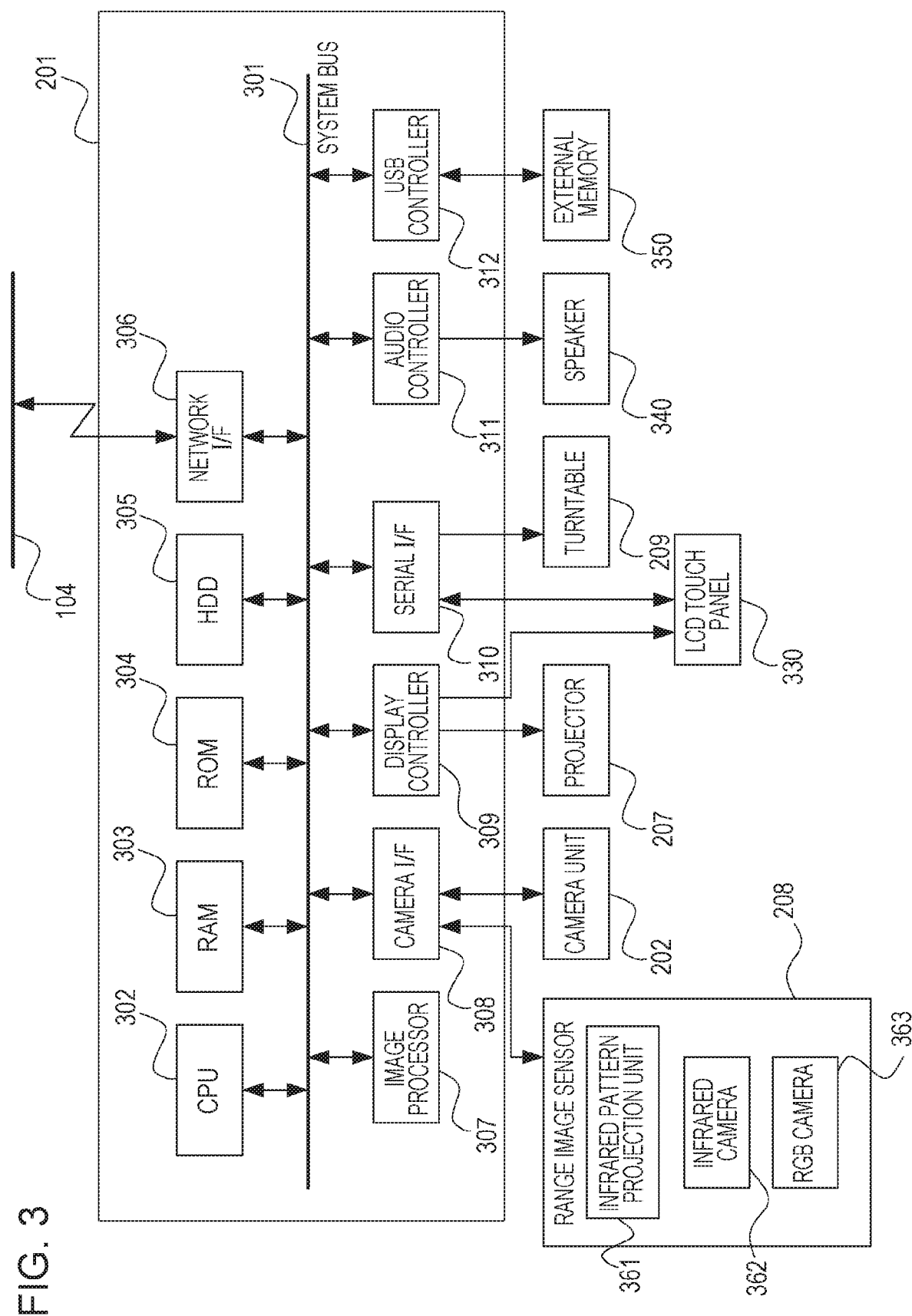
FIG. 3 is a diagram illustrating a hardware configuration of a controller unit of the camera scanner.

Furthermore, although not illustrated in FIGS. 2A to 2C, the camera scanner 101 may further include a liquid crystal display (LCD) touch panel 330, a speaker 340, and an external memory 350 illustrated in FIG. 3.

In FIG. 2B, in addition to the configuration of the camera scanner 101, coordinate systems of the camera scanner 101 are also illustrated. In the camera scanner 101, a camera coordinate system 221 of the camera unit 202, a range image sensor coordinate system 220 of the range image sensor unit 208, and a projector coordinate system 222 of the projector 207 are individually defined. In the coordinate systems 220 to 222, an image plane captured by the camera unit 202; an image plane captured by an RGB (red, green, and blue) camera 363 of FIG. 3, which is described below and is included in the range image sensor unit 208; and an image plane projected by the projector 207 are defined as XY planes. Furthermore, in each of the coordinate systems 220 to 222, a direction which is orthogonal to the XY planes (the image planes) is defined as a Z direction. Furthermore, in the camera scanner 101, an orthogonal coordinate system 223, having a plane including the document stand 204, which is set as an XY plane, and having a direction vertical to the XY plane (upward from the XY plan), which is set as a Z axis, is defined so that individual three-dimensional (3D) data of the coordinate systems 220 to 222 is integrally used.

Here, FIG. 2C illustrates the relationship between a space represented by the orthogonal coordinate system 223 and the camera coordinate system 221 including the camera unit 202 at a center and a camera image plane 224 captured by the camera unit 202 as an example case of conversion of the coordinate systems. A 3D point P[X, Y, Z] in the orthogonal coordinate system 223 may be converted into a 3D point Pc[Xc, Yc, Zc] in the camera coordinate system 221 in accordance with Expression (1):

$$[Xc,Yc,Zc]^T=[Rc|tc][X,Y,Z,1]^T. \quad (1)$$

Here, "RC" and "tc" in Expression (1) are external parameters obtained in accordance with an orientation (rotation) and a position (translation) of the camera unit 202 relative to the orthogonal coordinate system 223, and "Rc" is referred to as a rotation matrix and "tc" is referred to as a translation vector hereinafter. On the other hand, a 3D point defined by the camera coordinate system 221 may be converted into the orthogonal coordinate system 223 in accordance with Expression (2) below:

$$[X,Y,Z]^T=[Rc^{-1}|-R^{-1}tc][X,Y,Z,1]^T. \quad (2)$$

Furthermore, the two-dimensional (2D) camera image plane 224 captured by the camera unit 202 is obtained when the camera unit. 202 converts 3D information in a 3D space into 2D information. Specifically, the camera image plane 224 converts a 3D point Pc[Xc, Yc, Zc] on the camera coordinate system 221 into a 2D coordinate pc[xp, yp] by perspective projection in accordance with Expression (3) below:

$$\lambda[xp,yp,1]^T=A[Xc,Yc,Zc]^T. \quad (3)$$

Here, "A" in Expression (3) is referred to as an internal parameter of the camera unit 202 and is a matrix of 3 rows by 3 columns represented by a focus distance, an image center, and the like.

As described above, in accordance with Expressions (1) and (3), a 3D point group represented by the orthogonal coordinate system 223 is converted into a 3D point group coordinate in the camera coordinate system 221 or the camera image plane 224. Note that internal parameters of the various hardware devices, such as the camera unit 202, the range image sensor unit 208, and the projector 207, and position and orientation (an external parameter) relative to the orthogonal coordinate system 223, are calibrated in advance by a general calibration method. Hereinafter, the term "3D point group" indicates 3D data in the orthogonal coordinate system 223 unless otherwise noted.

Hardware Configuration of Controller Unit of Camera Scanner

FIG. 3 is a diagram illustrating a hardware configuration of the controller unit 201 of the camera scanner 101.

The controller unit 201 of FIG. 3 includes a central processing unit (CPU) 302, a random access memory (RAM) 303, a read only memory (ROM) 304, a hard disk drive (HDD) 305, and a network interface (I/F) 306. The controller unit 201 further includes an image processor 307, a camera I/F 308, a display controller 309, a serial I/F 310, an audio controller 311, and a universal serial bus (USB) controller 312. The various units are connected to one another through a system bus 301.

The CPU 302 controls all the operations of the controller unit 201. The RAM 303 is a volatile memory. The ROM 304 is a nonvolatile memory which stores a boot program of the CPU 302. The HDD 305 has capacity larger than that of the RAM 303. The HDD 305 stores a control program of the camera scanner 101 to be executed by the controller unit 201.

The CPU 302 executes the boot program stored in the ROM 304 at a time of activation, such as power-ON. When the boot program is executed, the control program stored in the HDD 305 is read and developed in the RAM 303. After executing the boot program, the CPU 302 subsequently executes the control program developed in the RAM 303 so as to control the various units. Furthermore, the CPU 302 stores data to be used for an operation based on the control program in the RAM 303 and performs reading and writing. The HDD 305 may further store various types of setting data required for the operation based on the control program and image data generated by camera inputs which are to be read and written under control of the CPU 302. The CPU 302 performs communication with other devices on the network 104 of FIG. 1 through the network I/F 306.

The image processor 307 reads and processes the image data stored in the RAM 303 and rewrites the image data in the RAM 303. Note that examples of the image processing performed by the image processor 307 include rotation, magnification, and color conversion.

The camera I/F 308 is connected to the camera unit 202 and the range image sensor unit 208, obtains image data from the camera unit 202 in accordance with an instruction issued by the CPU 302, obtains range image data from the range image sensor unit 208, and writes the data in the RAM 303. The camera I/F 308 transmits a control command supplied from the CPU 302 to the camera unit 202 and the range image sensor unit 208 so as to perform a setting of the camera unit 202 and the range image sensor unit 208.

The display controller 309 is connected to the projector 207 and the LCD touch panel 330. The display controller 309 controls the images that are displayed on a display of the projector 207 and the LCD touch panel 330 in accordance with an instruction issued by the CPU 302.

The serial I/F 310 inputs and outputs a serial signal. The serial I/F 310 is connected to the turntable 209 and transmits an instruction for starting rotation, an instruction for terminating rotation, and an instruction for indicating a rotation angle supplied from the CPU 302 to the turntable 209. The serial I/F 310 is also connected to the LCD touch panel 330. When the LCD touch panel 330 is touched, for example, the CPU 302 obtains a coordinate of a touched position, for example, through the serial I/F 310. The audio controller 311 is connected to the speaker 340, converts audio data into an analog audio signal in accordance with an instruction issued by the CPU 302, and outputs audio signals through the speaker 340.

The USB controller 312 controls an external USB device in accordance with an instruction issued by the CPU 302. Here, the USB controller 312 is connected to the external memory 350, such as a USB memory or an SD card, and performs reading of data from and writing of data to the external memory 350.

Functional Configuration of Control Program of Camera Scanner

Figure 4B:
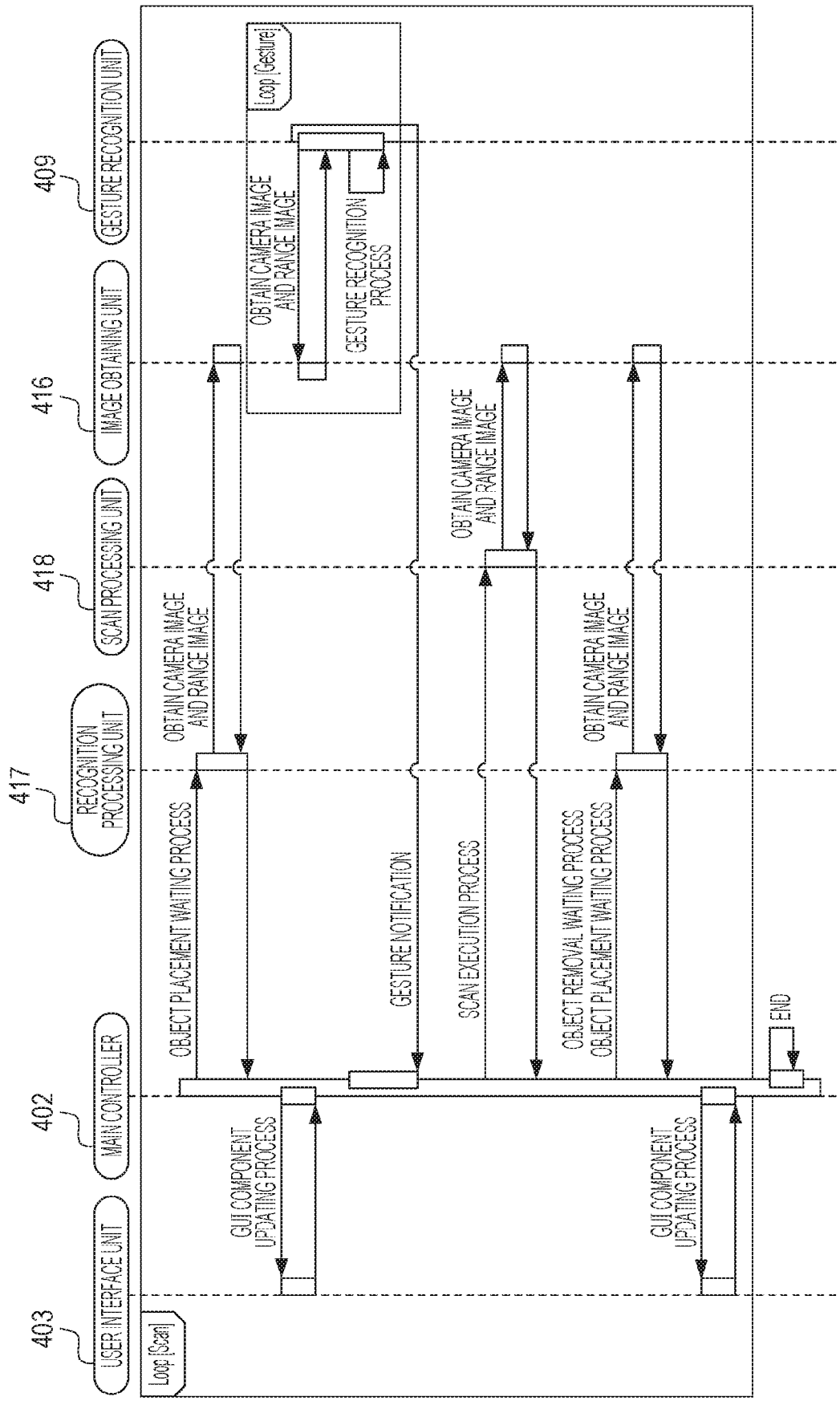

FIG. 4A is a diagram illustrating a functional block configuration 401 formed when the CPU 302 executes the control program of the camera scanner 101. FIG. 4B is a sequence diagram of a flow of processes performed by various units (e.g., software modules) of the functional block configuration 401 under control of a main controller 402. Note that the control program for the camera scanner 101 is stored in the HDD 305 as described above and is executed by the CPU 302 after being developed in the RAM 303 at a time of activation.

The main controller 402 serves as a control center and controls the various units included in the functional block configuration 401 in accordance with a flow illustrated in the sequence diagram of FIG. 4B. Specifically, processes of the units described below are individually controlled by the main controller 402 in accordance with the flow of the sequence of FIG. 4B.

An image obtaining unit 416 is a module which performs an image input process and includes a camera image obtaining unit 407 and a range image obtaining unit 408. The camera image obtaining unit 407 obtains image data output by the camera unit 202 through the camera I/F 308 and stores the image data in the RAM 303. The range image obtaining unit 408 obtains range image data output by the range image sensor unit 208 through the camera I/F 308 and stores the range image data in the RAM 303.

A recognition processing unit 417 detects and recognizes a movement of an object on the document stand 204 based on the image data obtained by the camera image obtaining unit 407 and the range image data obtained by the range image obtaining unit 408. The recognition processing unit 417 includes a gesture recognition unit 409 and an object detection unit 410. Although not illustrated, the recognition processing unit 417 may further include a document region extraction unit, a document region conversion unit, a feature point extraction unit, a 2D image document contour calculation unit, a distance calculation unit, and a document contour calculation unit. The document region extraction unit extracts a document region from image data. The document region conversion unit performs coordinate conversion and the like on the document region. The feature point extraction unit extracts a feature point of an image of the document region. The 2D image document contour calculation unit calculates a contour of the 2D image in the document region. The distance calculation unit calculates a distance between feature points corresponding to each other. The document contour calculation unit calculates a contour of the document region. The gesture recognition unit 409 constantly obtains images on the document stand 204 from the image obtaining unit 416. When detecting a gesture, such as a touch by a user, the gesture recognition unit 409 notifies the main controller 402 of the gesture. When receiving a notification of an object placement waiting process or an object removal waiting process from the main controller 402, the object detection unit 410 obtains an image obtained by capturing the document stand 204 from the image obtaining unit 416. The object detection unit 410 performs a process of detecting a time when an object is placed on the document stand 204 and becomes stationary or a time when the object is removed. The process of the object detection unit 410 included in the recognition processing unit 417 will be described in detail hereinafter with reference to FIGS. 5A to 5D.

A scan processing unit 418 is a module which actually performs scanning on a target and includes a plane document image capturing unit 411, a book image capturing unit 412, and a solid shape measurement unit 413. The plane document image capturing unit 411, the book image capturing unit 412, and the solid shape measurement unit 413 perform processes suitable for a plane document, a book, and a solid, respectively, and output data of corresponding formats.

A user interface unit 403 includes a graphical user interface (GUI) component generation display unit 414 and a projection region detection unit 415. When receiving a request from the main controller 402, the GUI component generation display unit 414 generates GUI components including a message and a button. Then the GUI component generation display unit 414 requests a display unit 406 to display the generated GUI components. By this, the GUI components (e.g., user interface images) are displayed on the document stand 204 or an object mounted on the document stand 204 in an overlapping manner. Accordingly, in this case, the user may use a real object on the document stand 204 as an interface with electronic data. Note that a display region of the GUI components on the document stand 204 is detected by the projection region detection unit 415.

The display unit 406 displays the requested GUI components on the projector 207 or the LCD touch panel 330 through the display controller 309. Since the projector 207 faces the document stand 204, the GUI components may be projected on the document stand 204 for display.

Furthermore, the user interface unit 403 receives a gesture operation, such as a touch operation recognized by the gesture recognition unit 409 or an input operation performed using the LCD touch panel 330 through the serial I/F 310, and a coordinate of the operation. Thereafter, the user interface unit 403 determines the content of an operation (such as pressing of a button) performed by the user by matching the content of an operation screen that is being rendered and an operation coordinate. The main controller 402 accepts the user operation when receiving the operation content.

A network communication unit 404 performs communication in accordance with TCP/IP with other devices on the network 104 through the network I/F 306.

A data management unit 405 stores various data, including work data generated by execution of the control program in a certain region of the HDD 305, and manages the data. Examples of the data include scan data generated by the plane document image capturing unit 411, the book image capturing unit 412, and the solid shape measurement unit 413.

A data transfer processing unit 420 performs a process of data transfer with the smartphone 106 connected through the network communication unit 404. The data transfer process will be described in detail hereinafter.

Range Image Sensor and Range Image Obtaining Unit

The range image sensor unit 208 employs a pattern projection method using infrared light and includes an infrared pattern projection unit 361, an infrared camera 362, and the RGB camera 363 as illustrated in FIG. 3. The infrared pattern projection unit 361 projects a 3D measurement pattern invisible infrared light on a target object. The infrared camera 362 reads the 3D measurement pattern projected on the target object. The RGB camera 363 captures an image of visible light using an RGB signal.

Although the infrared pattern projection method employed in the range image sensor unit 208 as described above in this embodiment, a range image sensor employing another method may be used. For example, a stereo method for performing stereoscopic viewing using two RGB cameras or a Time-of-Flight (TOF) method for performing range measurement by detecting a flight time of laser light may be employed.

Gesture Recognition Unit

A process performed by the gesture recognition unit 409 will be described in detail.

The gesture recognition unit 409 obtains a range image and a 3D point group from the range image obtaining unit 408. Subsequently, the gesture recognition unit 409 extracts a 3D point group of a hand by extracting a 3D point group of a skin color that is located in a position equal to or higher than a predetermined height relative to a plane including the document stand 204. Thereafter, the gesture recognition unit 409 generates a 2D image by projecting the extracted 3D point group of the hand on the plane of the document stand 204 and detects an outline of the hand. Here, the correspondence relationships between points of the 3D point group of the hand and coordinates of the 2D image projected on the plane of the document stand 204 are also stored. Subsequently, the gesture recognition unit 409 calculates curvatures at points on the detected outline of the hand and detects points having the calculated curvatures smaller than a predetermined value as a fingertip. Thereafter, the gesture recognition unit 409 calculates a distance between the detected fingertip and the plane including the document stand 204 using the 3D point group in accordance with the correspondence relationships. When the calculated distance is equal to or smaller than a small predetermined value, the gesture recognition unit 409 detects a touch gesture and notifies the main controller 402 of the detection.

Although a method for detecting a fingertip in a 2D image projected using a 3D point group in fingertip detection has been described, a target image for the fingertip detection is not limited to this. For example, a background difference of a range image may be extracted, or a region corresponding to a hand may be extracted from a skin color region of an RGB image, and thereafter, a region corresponding to a fingertip may be detected in the hand region by the method described above (outline curvature calculation or the like).

Process of Object Detection Unit

Hereinafter, a process performed by the object detection unit 410 will be described with reference to flowcharts of FIGS. 5A to 5D. Note that, in a description below, step S801 to step S834 in the processes in the flowcharts of FIGS. 5A to 5D are simply referred to as S801 to S834. This is true of other flowcharts described hereinafter.

Figure 5A:
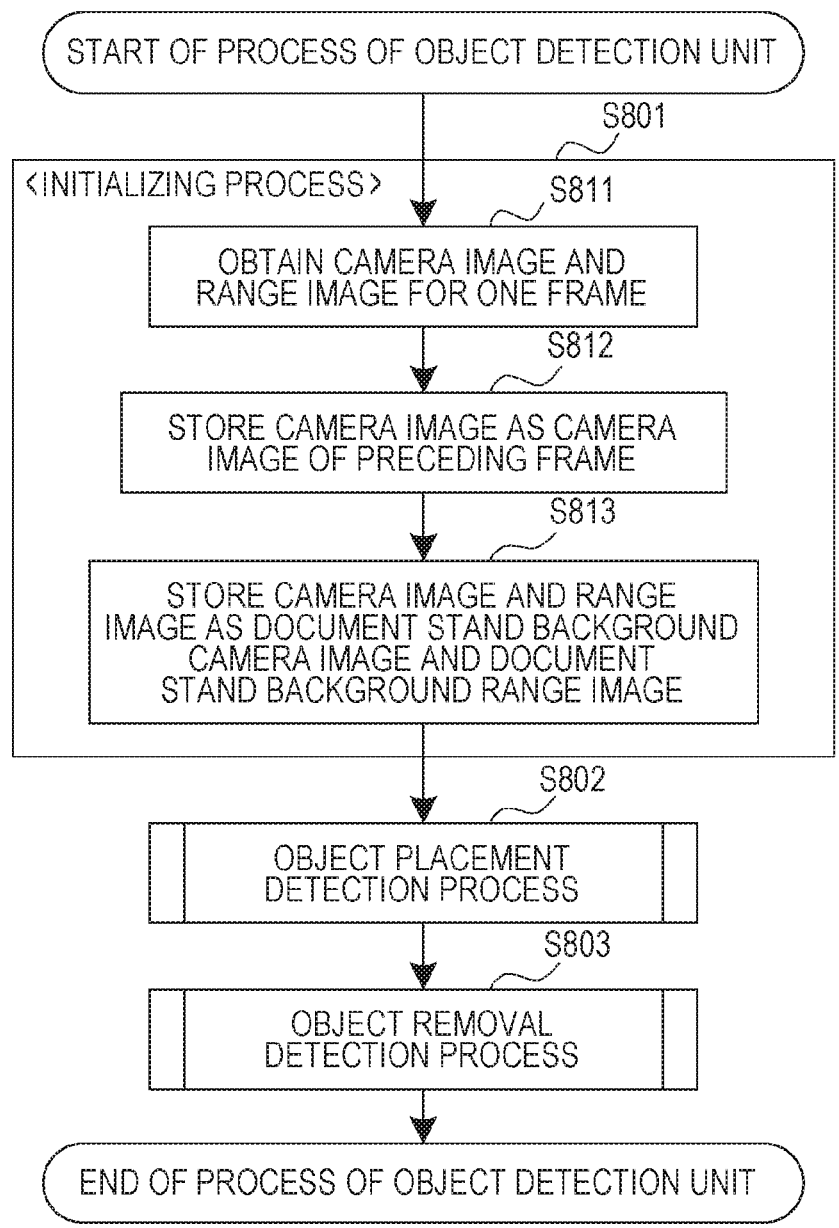
FIGS. 5A to 5D are flowcharts of processes executed by an object detection unit.

When the process of the flowchart of FIG. 5A is started, the object detection unit 410 performs an initializing process in S801 that includes S811 to S813. In S811, the object detection unit 410 obtains a camera image and a range image for one frame from the camera image obtaining unit 407 and the range image obtaining unit 408, respectively. In S812, the object detection unit 410 stores the obtained camera image as a preceding-frame camera image. In S813, the object detection unit 410 stores the obtained camera image and the obtained range image as a document stand background camera image and a document stand background range image, respectively. Hereinafter, the terms "document stand background camera image" and "document stand background range image" indicate the camera image and the range image obtained in this step. After S813, the object detection unit 410 proceeds to S802.

In S802, the object detection unit 410 determines whether an object has been placed on the document stand 204 (an object placement detection process). This process will be described in detail below with reference to FIGS. 5B and 5C. After S802, the object detection unit 410 proceeds to S803.

In S803, the object detection unit 410 determines whether the object that has detected on the document stand 204 in S802 has been removed (an object removal detection process). This process will be described in detail below with reference to FIG. 5D. After S803, the object detection unit 410 terminates the process in the flowchart of FIG. 5A.

Figure 5B:
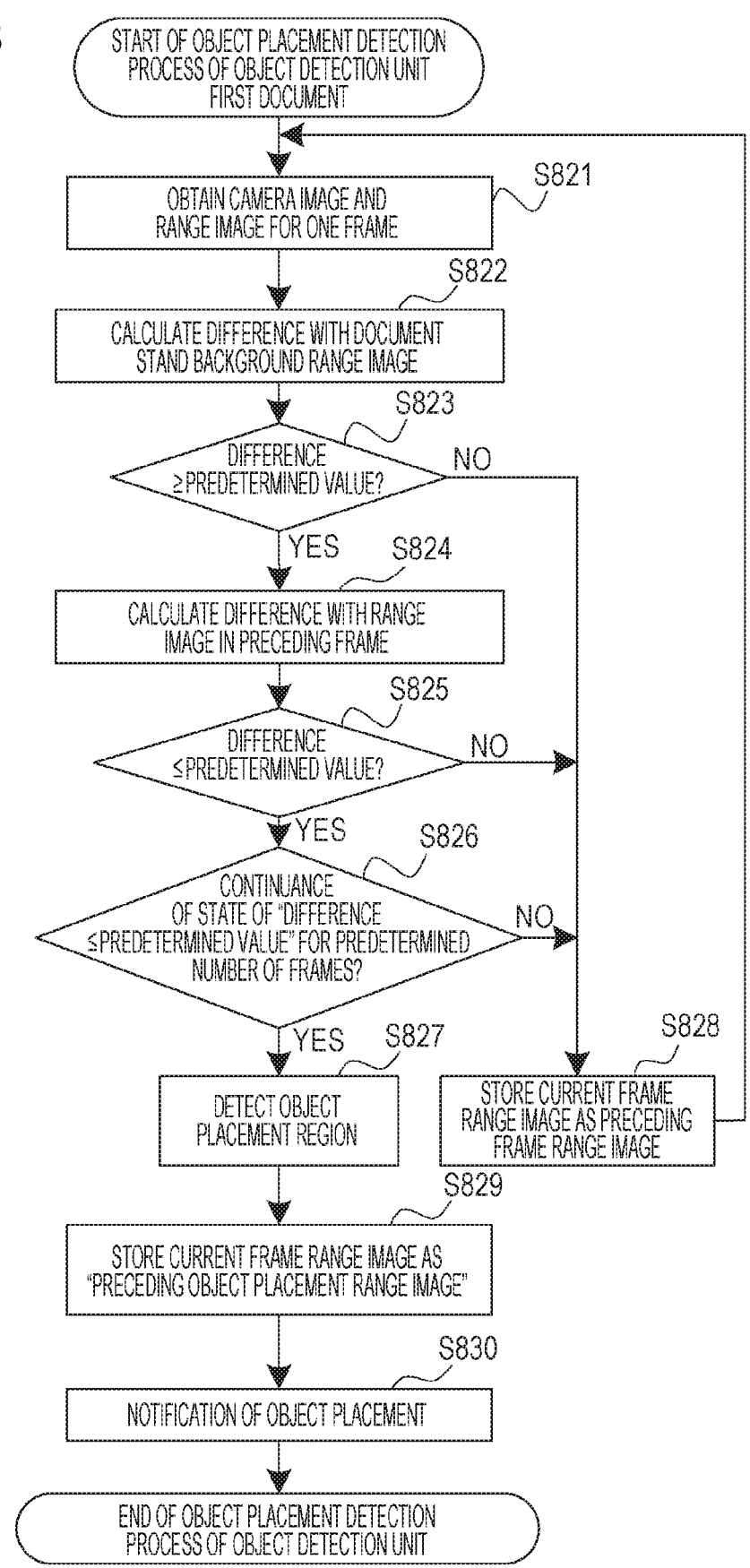

FIG. 5B is a flowchart of the object placement detection process in S802 of FIG. 5A performed when a first object is placed in detail. This process is performed after the initializing process in FIG. 5A and the object removal detection process in FIG. 5D described below.

In S821 of FIG. 5B, the object detection unit 410 obtains a camera image and a range image for one frame from the camera image obtaining unit 407 and the range image obtaining unit 408, respectively. After S821, the object detection unit 410 proceeds to S822.

In S822, the object detection unit 410 calculates a difference between the obtained range image and the preceding-frame range image and calculates a difference value by adding absolute values so as to obtain a range image in a range to the document stand (a document stand background range image). After S822, the object detection unit 410 proceeds to S823.

In S823, the object detection unit 410 determines whether the calculated difference value is equal to or larger than a predetermined value. When the determination is negative in S823 (NO), the object detection unit 410 determines that no object is placed on the document stand 204 and proceeds to S828. In S828, the object detection unit 410 stores the camera image and the range image in the current frame as a preceding-frame camera image and a preceding-frame range image, respectively, before returning to S821. On the other hand, when the determination is affirmative in S823 (YES), the process proceeds to S824. In S824, the object detection unit 410 calculates a difference value between the range image obtained in S821 and the preceding-frame range image similarly to S822. After S824, the object detection unit 410 proceeds to S825.

In S825, the object detection unit 410 determines whether the calculated difference value is equal to or smaller than a predetermined value. When the determination is negative in S825 (NO), the object detection unit 410 determines that an object on the document stand 204 is moving and proceeds to S828. In S828, the object detection unit 410 stores the range image in the current frame as a preceding-frame range image before returning to S821. On the other hand, when the determination is affirmative in S825 (YES), the object detection unit 410 proceeds to S826.

In S826, the object detection unit 410 determines whether a state in which the difference value is equal to or smaller than a predetermined value, that is, a stationary state of the object on the document stand 204, has continued for a predetermined number of frames in accordance with the number of consecutive positive results of the determination in S825. When the determination is negative in S826 (NO), the object detection unit 410 proceeds to S828. In S828, the object detection unit 410 stores the camera image and the range image in the current frame as a preceding-frame camera image and a preceding-frame range image, respectively, before returning to S821. When the determination is affirmative in S826 (YES), the object detection unit 410 proceeds to S827.

In S827, the object detection unit 410 calculates a difference image between a range image in a latest frame and the document stand background range image and performs a labeling process on the difference image. Thereafter, the object detection unit 410 determines that a label having a predetermined number of pixels or more corresponds to a region where an object is placed, and records a rectangle region including the pixels having the label as object placement region information of the placed object. When a plurality of labels have a predetermined number of pixels or more, the object detection unit 410 determines that a plurality of objects have been placed and records individual object placement region information of the objects. After S827, the object detection unit 410 proceeds to S829.

In S829, the object detection unit 410 stores the current frame range image as a "preceding-object-placement range image". Thereafter, the object detection unit 410 notifies the main controller 402 of the placement of the object in addition to the object placement region information (an object placement notification) and terminates the object placement detection process of FIG. 5B.

Figure 5C:
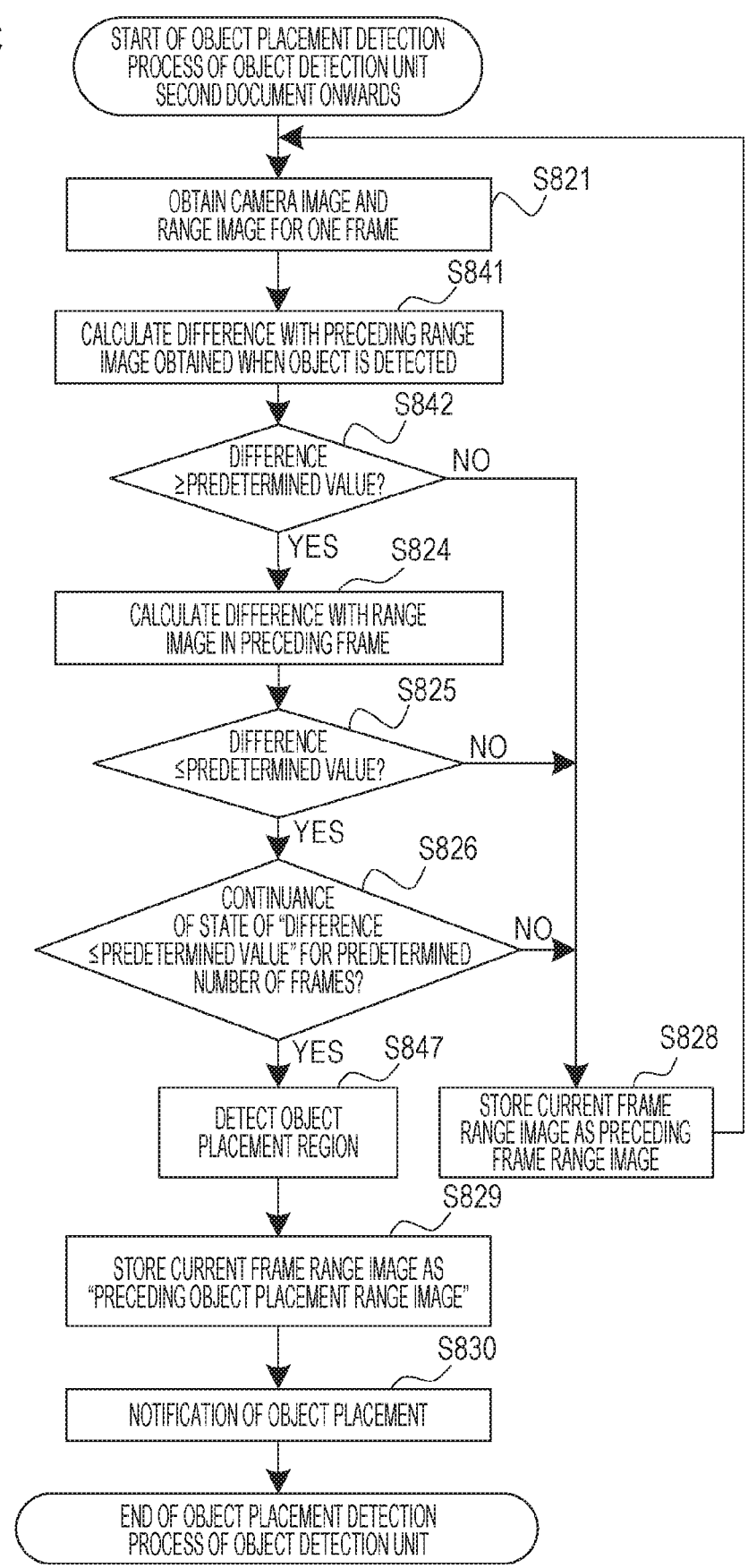

FIG. 5C is a detailed flowchart of the object placement detection process in S802 of FIG. 5A performed when a second object onwards are placed. In FIG. 5C, processes the same as those in FIG. 5B are denoted by reference numerals the same as those in FIG. 5B, and descriptions thereof are omitted.

After S821 of FIG. 5C, the object detection unit 410 proceeds to S841. In S841, the object detection unit 410 calculates a difference between an obtained range image and the "preceding-object-placement range image" and calculates a difference value by adding absolute values of the difference. After S841, the object detection unit 410 proceeds to S842.

In S842, the object detection unit 410 determines whether the calculated difference value is equal to or larger than a predetermined value. When the determination is negative in S842 (NO), the object detection unit 410 determines that a new object is not captured and proceeds to S828. On the other hand, when the determination is affirmative in S842 (YES), the object detection unit 410 determines that a new object is captured and proceeds to S824.

Furthermore, when determining that a predetermined number of consecutive frames have difference values which are equal to or smaller than a predetermined value (YES) in S826 of FIG. 5C, the object detection unit 410 proceeds to S847 in FIG. 5C. In S847, the object detection unit 410 calculates a difference image between a range image in a latest frame and the "preceding-object-placement range image" and performs a labeling process on the difference image. Note that the process in S827 is performed on a result of the labeling. After S847, the object detection unit 410 proceeds to S829.

Figure 5D:
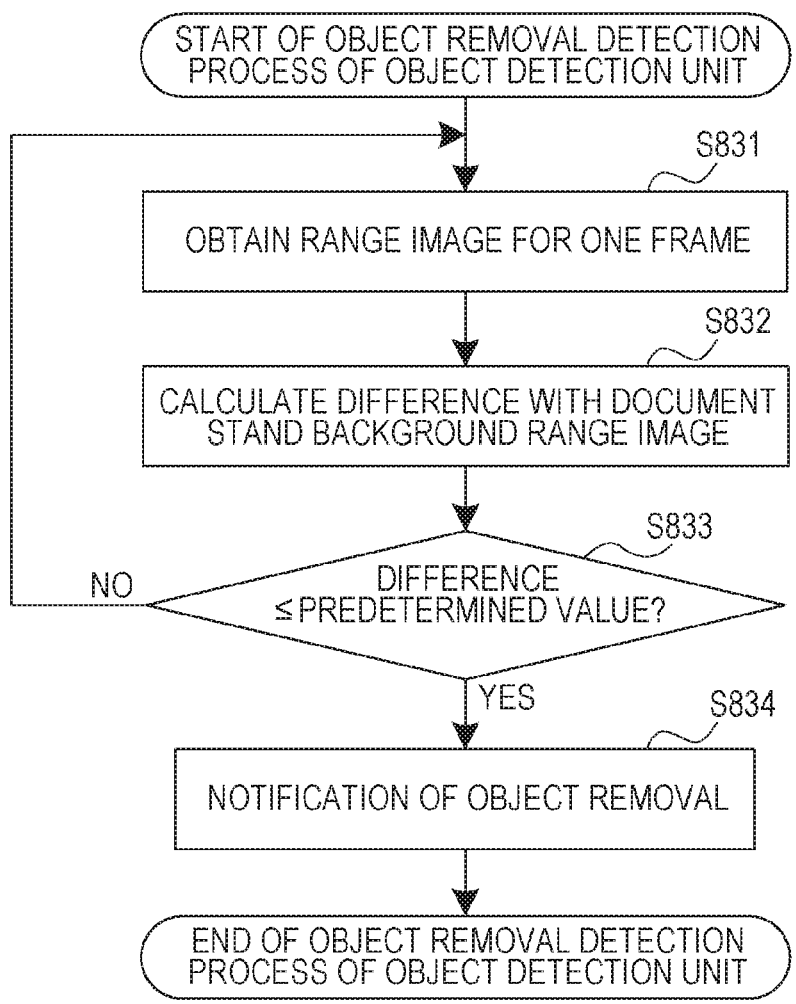

FIG. 5D is a flowchart of the object removal detection process in S803 of FIG. 5A illustrated in detail.

When starting the object removal detection process, the object detection unit 410 obtains a range image for one frame from the range image obtaining unit 408 in S831 of FIG. 5D. After S831, the object detection unit 410 proceeds to S832.

In S832, the object detection unit 410 calculates a difference value between the obtained range image and the document stand background range image. After S832, the object detection unit 410 proceeds to S833.

In S833, the object detection unit 410 determines whether the calculated difference value is equal to or smaller than a predetermined value. When the determination is negative (NO) in S833, the object detection unit 410 returns to S831 so as to continue the process since an object is still on the document stand 204. On the other hand, when the determination is affirmative in S823 (YES), the process proceeds to S834. Thereafter, since an object is removed from the document stand 204, the object detection unit 410 transmits a notification (an object removal notification) to the main controller 402 and terminates the object removal detection process of FIG. 5C.

Hardware Configuration of Controller of Smartphone

FIG. 6 is a diagram schematically illustrating a hardware configuration of a controller unit 801 of the smartphone 106 of FIG. 1.

The controller unit 801 of FIG. 6 includes a CPU 902, a RAM 903, a ROM 904, a flash memory 905, a network I/F 906, a display controller 909, and a serial I/F 910. These units are connected to a system bus 901.

The CPU 902 controls an entire operation of the controller unit 801. The RAM 903 is a volatile memory. The ROM 904 is a nonvolatile memory which stores a boot program of the CPU 902. The flash memory 905 is a nonvolatile memory having larger capacity than the ROM 904. The flash memory 905 stores a control program of the smartphone 106 to be executed by the controller unit 801.

The CPU 902 executes the boot program stored in the ROM 904 at a time of activation, such as power-ON. When the boot program is executed, the control program stored in the flash memory 905 is read and developed the RAM 903. After executing the boot program, the CPU 902 subsequently executes the control program developed in the RAM 903 so as to control the various units. Furthermore, the CPU 902 stores data to be used for an operation based on the control program in the RAM 903 and performs reading and writing. The flash memory 905 may further store various settings required for the operation based on the control program and various data, including image data which are read and written under control of the CPU 902. The CPU 902 performs communication with other devices on the network 104 through the network I/F 906.

The display controller 909 is connected to a display of an LCD touch panel 990. The display controller 909 controls the display of images on a display of the LCD touch panel 990 in accordance with an instruction issued by the CPU 902.

The serial I/F 910 inputs and outputs a serial signal. Here, the serial I/F 910 is connected to the LCD touch panel 990. When the LCD touch panel 990 is pressed, the CPU 902 obtains a coordinate of a pressed position through the serial I/F 910.

Concrete Example of Data Transfer Between Smartphone and Camera Scanner

Hereinafter, an example of transfer of image data from the smartphone 106 to the camera scanner 101, which displays the image data, will be described in detail with reference to FIGS. 7A to 7G, FIGS. 8A to 8H, and FIGS. 9A and 9B.

FIGS. 7A to 7G are diagrams illustrating screen transitions of the smartphone 106 when a data transfer process is performed.

FIGS. 8A to 8H are diagrams illustrating states of the surface of the document stand 204 of the camera scanner 101 when the data transfer process is performed, that is, an image projected by the projector 207 and an object physically placed on the document stand 204 are simultaneously displayed.

Figure 8A:
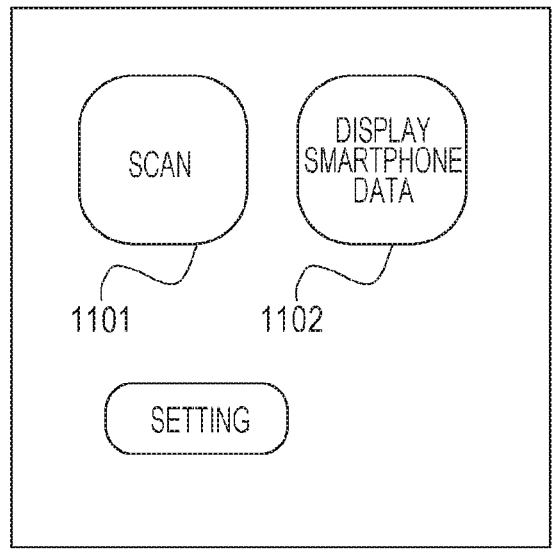
FIGS. 8A to 8H are diagrams illustrating states of a surface D a document stand according to a first embodiment.

FIG. 8A is a diagram illustrating a screen projected by the projector 207 and displayed on the document stand 204 immediately after the camera scanner 101 is activated. The projection screen, which is displayed immediately after the activation that is illustrated in FIG. 8A displays a scan button 1101 to be operated by the user when scanning is performed by the camera scanner 101 and a smartphone data display button 1102 to be operated by the user when an image transferred from the smartphone 106 is displayed. The process of transferring an image from the smartphone 106 to the camera scanner 101 is started when the user operates the smartphone data display button 1102 on the projection screen of the camera scanner 101 illustrated in FIG. 8A. Specifically, the main controller 402 of the camera scanner 101 starts a processing flow of FIG. 9B, described below, using the user operation as a trigger.

Furthermore, the CPU 902 of the smartphone 106 starts the process of image transfer when the user performs the following operation.

Figure 7A:
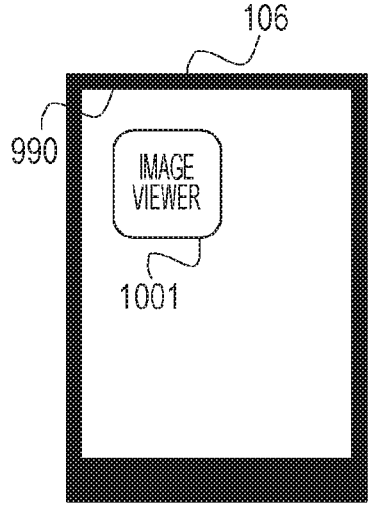
FIGS. 7A to 7G are diagrams illustrating screen transitions of the smartphone at a time of a data transfer process.

First, when the user inputs an operation instruction for displaying a home screen for image transfer, the CPU 902 of the smartphone 106 causes a display to display the home screen illustrated in FIG. 7A, and thereafter activates image viewer application software. The application software is simply referred to as "app" hereinafter.

Figure 7B:
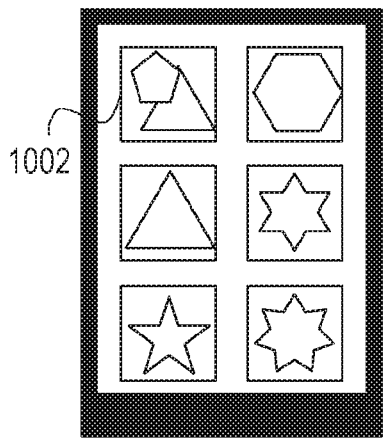

Furthermore, the CPU 902 displays a list of thumbnail images as illustrated in FIG. 7B on a display screen of the LCD touch panel 990 through the display controller 909. Although not described hereinafter, the display on the display screen of the LCD touch panel 990 is performed through the display controller 909 under control of the CPU 902.

Figure 7C:
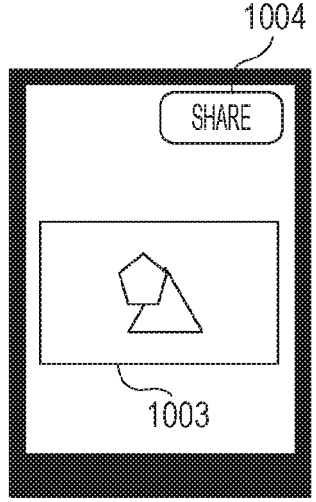

When the user selects a thumbnail image 1002 of an image to be transferred from the list of thumbnail images illustrated in FIG. 7B, the CPU 902 displays an original image 1003 of the selected thumbnail image 1002 as illustrated in FIG. 7C. Furthermore, the CPU 902 also displays a "share" button 1004 at this time. Note that, although not illustrated, the selection by the user on the screen is performed through a touch operation on the LCD touch panel 990. The CPU 902 recognizes the selection of the user based on information on the operation performed by the user on the LCD touch panel 990.

Figure 7D:
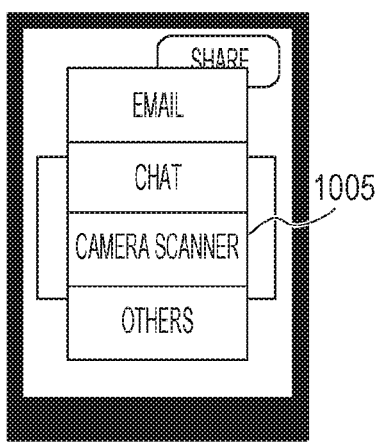

When the user selects the share button 1004, the CPU 902 displays a sharable app list as illustrated in FIG. 7D. Here, the CPU 902 displays an image transfer app stored in the flash memory 905 in advance in the sharable app list. The image transfer app is used to execute a process in FIG. 9A described below.

Subsequently, when the user selects an item 1005 of a camera scanner app in the sharable app list, for example, the CPU 902 starts a processing flow of FIG. 9A described below. Thereafter, the user places the smartphone 106 on a smartphone placement region 1103, described below, on the document stand 204.

Figure 9A:
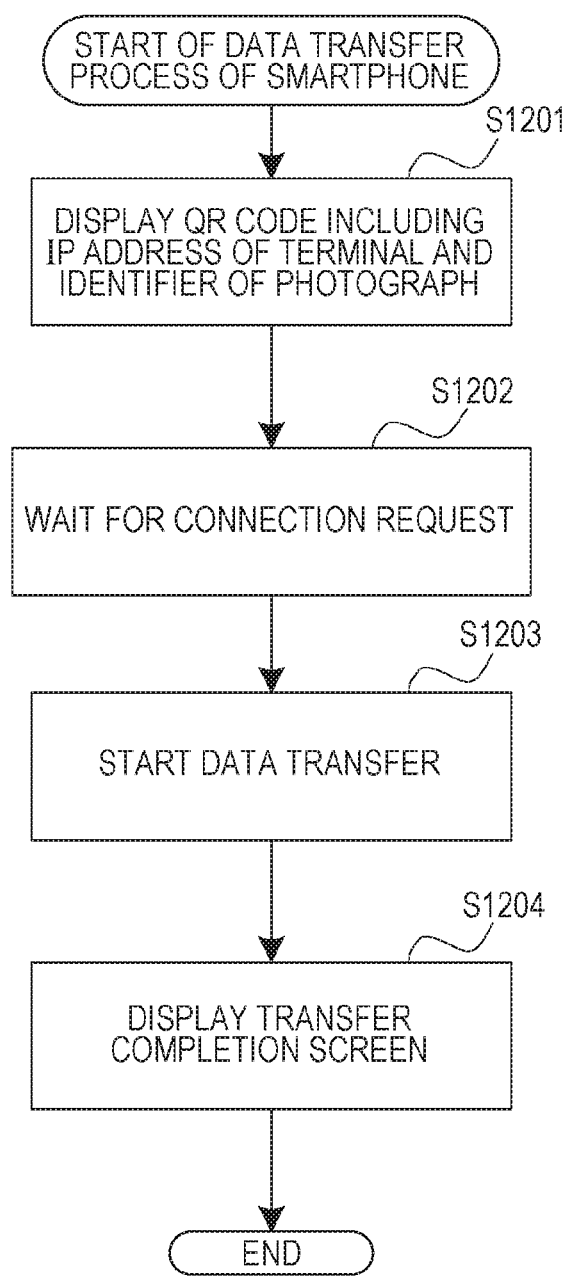
FIGS. 9A and 9B are flowcharts of transfer processes of the smartphone and the camera scanner, respectively.

FIG. 9A is a flowchart of the data transfer process performed by the smartphone 106. A process of the flowchart in FIG. 9A is executed by the CPU 902 of the smartphone 106 and started when the user selects one of the items 1005 of the camera scanner app in the sharable app list of FIG. 7D.

Figure 7E:

In S1201 of FIG. 9A, the CPU 902 sets a unique identifier to a photograph to be transmitted (corresponding to an image selected in FIG. 7B) and stores the photograph with the unique identifier in the RAM 903. Furthermore, the CPU 902 encodes data transfer information including the identifier of the photograph and connection information required for connection of an external apparatus (the camera scanner 101 in this embodiment) to the smartphone 106 by a predetermined encoding method so as to generate an encoded image. In this embodiment, an IP address of the smartphone 106 is used as the connection information. Specifically, the CPU 902 generates a character string (1: 192.268.0.1, for example) described in a format "<an identifier of a photograph to be transmitted>:<an IP address of the smartphone 106>" as data transfer information. Then the CPU 902 encodes the character string of the data transfer information to obtain a QR code as an example of an image encoded by the predetermined encoding method. Furthermore, the CPU 902 displays an image of the QR code in a display of the LCD touch panel 990 as illustrated in FIG. 7E. Thereafter, the QR code displayed in the display of the LCD touch panel 990 of the smartphone 106 placed on the document stand 204 is captured and decoded (decrypted) by the camera scanner 101 so that the camera scanner 101 obtains data transfer information. Note that the data transfer information may be encoded by another method instead of the QR code as long as the camera scanner 101 may detect (decode) the data transfer information. Although the identifier of the photograph in the data transfer information is represented by a single digit number for simplicity, the information may be represented by another expression method. Note that, when the identifier is short, data to be transferred to the camera scanner 101 by the user may be obtained by a third person who attempts to access the identifier by a brute-force attack. Therefore, the identifier preferably has an efficiently long identifier name in terms of security. After S1201, the CPU 902 proceeds to S1202.

In S1202, the CPU 902 opens a socket in a predetermined port (12345, for example) and enters a connection waiting state. Thereafter, when a data transfer request of a format "SENDREQ: <identifier of photograph>" transmitted in S1227 of FIG. 9B described below is received by this port, the CPU 902 returns "ACK" and proceeds to S1203.

Figure 7F:
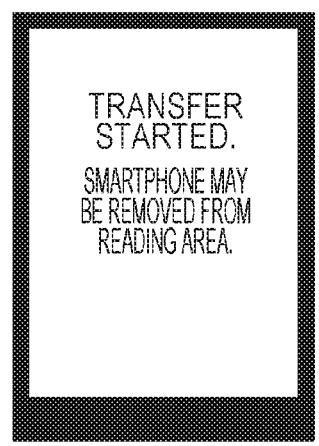

In S1203, the CPU 902 compares the identifier of the photograph included in the data transfer request received in S1202 with the identifier of the photograph set in S1201. If the identifiers match each other, the CPU 902 starts transfer of data of the photograph, and in addition, displays a screen indicating that the data transfer is being performed, for example as illustrated in FIG. 7F. Thereafter, when the data transfer is completed, the CPU 902 proceeds to S1204.

Figure 7G:

In S1204, the CPU 902 displays a screen indicating that the data transfer is completed in the display, for example, as illustrated in FIG. 7G.

Figure 9B:
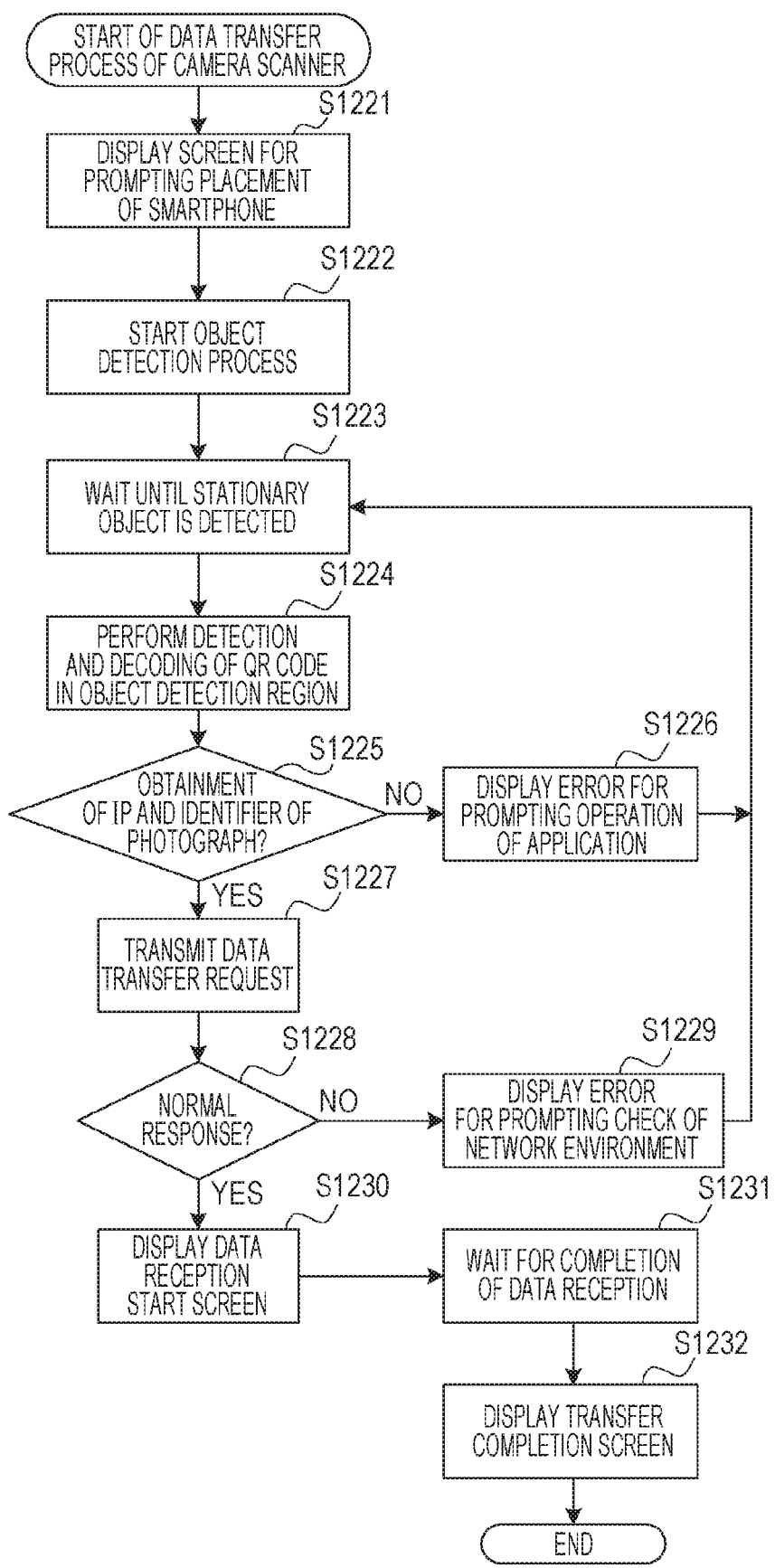

FIG. 9B is a flowchart of the data transfer process performed by the camera scanner 101. A flow of the data transfer process is executed when the main controller 402 of the camera scanner 101 controls the various units and is started when the initializing process in S801 of FIG. 5A, described above, is terminated.

In S1221 of FIG. 9B, the main controller 402 causes the projector 207 to project and display a screen that prompts the user to place the smartphone 106 on the document stand 204. For example, the screen illustrated in FIG. 8B may be projected and displayed on the document stand 204. The screen illustrated in FIG. 8B includes the smartphone placement region 1103. Although a description is omitted hereinafter, the projection and display on the document stand 204 are performed under control of the main controller 402 through the user interface unit 403 and the display unit 406. After S1221, the main controller 402 proceeds to S1222.

In S1222, the main controller 402 causes the object detection unit 110 to start the object detection process. After S1222, the main controller 402 proceeds to S1223.

In S1223, the main controller 402 waits until the object detection unit 410 detects an object placed on the document stand 204 and a notification indicating the detection is supplied from the object detection unit 410. When receiving the notification indicating the detection of the object placement in S1223, the main controller 402 proceeds to S1224. In a case of this embodiment, a state of the document stand 204 is illustrated in FIG. 8C at this time point. Specifically, the document stand 201 is in a state in which the smartphone 106 that displays the QR code on the screen of the smartphone 106 is placed on the document stand 204.

In S1224, the main controller 402 obtains a camera image from the camera image obtaining unit 407, extracts a region corresponding to the object in the camera image based on the object placement region information, and decodes the QR code included in the extracted region by a general method. Note that, when the camera image is to be obtained, a black image may be displayed on the entire surface of the document stand 204 in advance (the entire screen is filled with black) so that reflection of display of the GUI components do not degrade detection accuracy of the QR code, and the original display may be obtained after the camera image is obtained. After S1224, the main controller 402 proceeds to S1225.

In S1225, the main controller 402 determines whether information on a format "<identifier of photograph>:<IP address>" (text information, for example) is obtained as a result of the decoding of the QR code. When the determination is affirmative (YES) in S1225, the main controller 402 proceeds to S1227. When the determination is negative (NO) in S1225, the main controller 402 proceeds to S1226.

In S1226, the main controller 402 projects and displays an error screen, which prompts the user to operate a smartphone app. The state of the document stand 204 is illustrated in FIG. 8G at this time point. After S1226, the main controller 402 returns to S1223.

A process in S1227 is performed by the data transfer processing unit 420 under control of the main controller 402. In S1227, the data transfer processing unit 420 transmits a request for transferring data of a format "SENDREQ:<identifier of photograph>" to the predetermined port (12345, for example) of the IP address obtained in S1224. The identifier of the photograph transmitted here is obtained in S1224. After S1227, the data transfer processing unit 420 proceeds to S1228.

S1228, the data transfer processing unit 420 determines whether a response "ACK" has been transmitted from the smartphone 106. When the determination is affirmative in S1228 (YES), the main controller 402 proceeds to S1230. When the determination is negative in S1228 (NO), the main controller 402 proceeds to S1229.

In S1229, the main controller 402 projects and displays an error screen which prompts the user to check a network environment. The state of the document stand 204 is illustrated in FIG. 8H at this time point. After S1229, the main controller 402 returns to S1223.

In S1230, the main controller 402 projects and displays a data reception start screen, which notifies the user of a reception of data. The state of the document stand 204 is illustrated in FIG. 8D at this time point. After S1230, the main controller 402 proceeds to S1231.

A process in S1231 is performed by the data transfer processing unit 420 under control of the main controller 402. In S1231, the data transfer processing unit 420 continues the data reception process until the reception of data transmitted from the smartphone 106 is completed. When the reception of data transmitted from the smartphone 106 is completed (completion of data transfer), the data transfer processing unit 420 notifies the main controller 402 of the completion and the main controller 402 proceeds to S1232.

In S1232, the main controller 402 projects and displays a data transfer completion screen, which notifies the user of the completion of data transfer. The image 1003 of the photograph received from the smartphone 106 is displayed in the projected and displayed screen. Here, if the main controller 402 does not receive a notification indicating that the object has been removed from the document stand 204 from the object detection unit 410 before the process in S1232, the main controller 402 displays the image 1003 of the photograph in a region different from the smartphone placement region 1103. The document stand 204 enters a state of FIG. 8E, and the image 1003 of the photograph is displayed in an upper portion of the screen, for example. On the other hand, if the main controller 402 has received the notification indicating that the object has been removed from the document stand 204 from the object detection unit 410 before the process in S1232, the main controller 402 displays the image 1003 of the photograph in the center of the screen. Furthermore, the main controller 402 also displays an end button 1104, which receives an instruction for terminating the screen display from the user. The state of the document stand 204 is illustrated in FIG. 8F at this time point. The end button 1104 is operated when the user instructs an end of the data display app for displaying data transferred from the smartphone 106. When the end button 1104 is pressed by the user, the main controller 402 returns to an initial screen (FIG. 8A).

As described above, according to the first embodiment, the user may perform data transfer from the smartphone 106 to the camera scanner 101 by a small number of operations. In particular, if the operation is started in a state in which the user desires transfer of an image to a camera scanner while viewing the image on the screen of the smartphone 106, the user only requires the following operations.

The share button 1004 is pressed in the state of FIG. 7C.

One of the items 1005 of the camera scanner 101 is selected in the state of FIG. 7D.

The smartphone data display button 1102 in FIG. 8A is pressed.

Figure 8B:
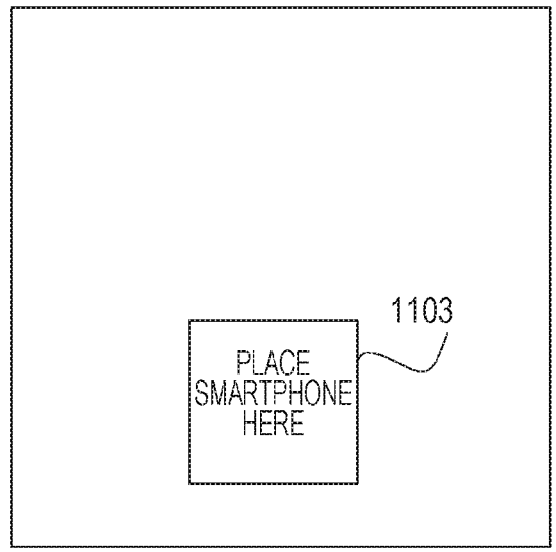
Figure 8C:
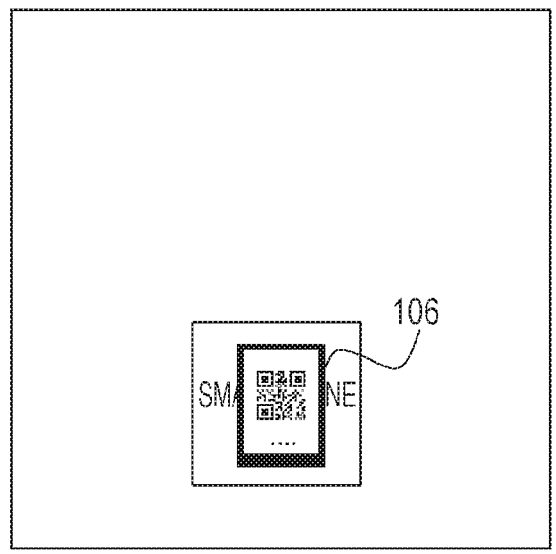
Figure 8D:
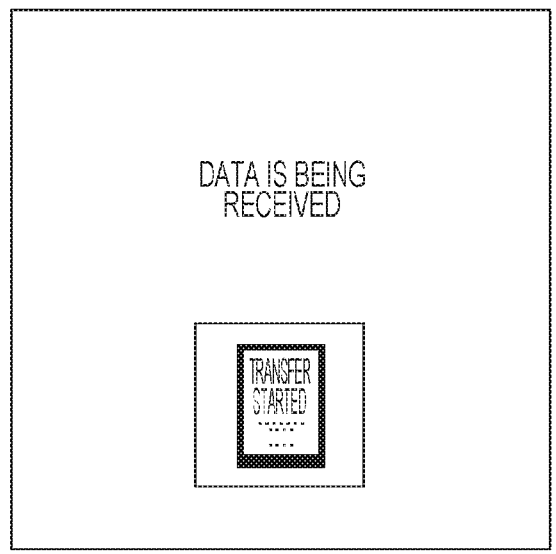
Figure 8E:
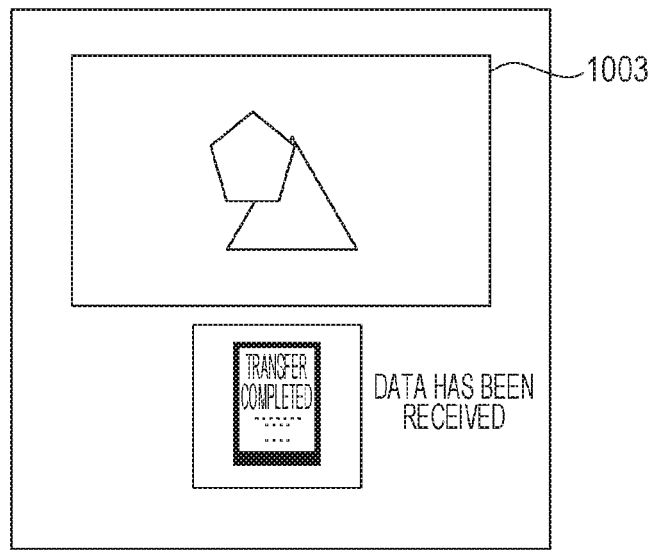
Figure 8F:
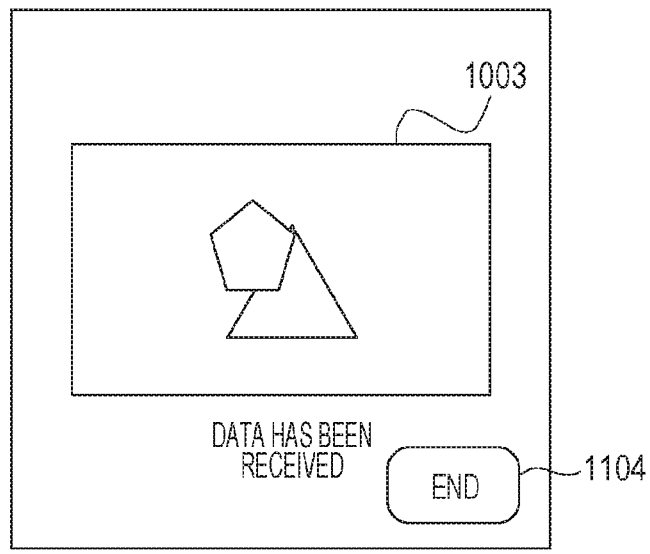
Figure 8G:
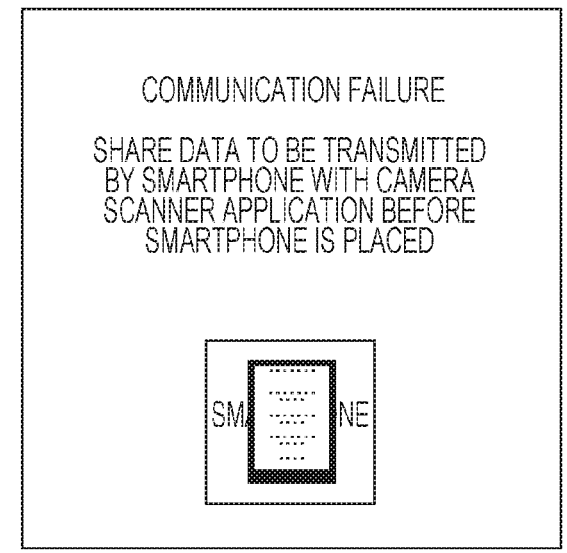
Figure 8H:
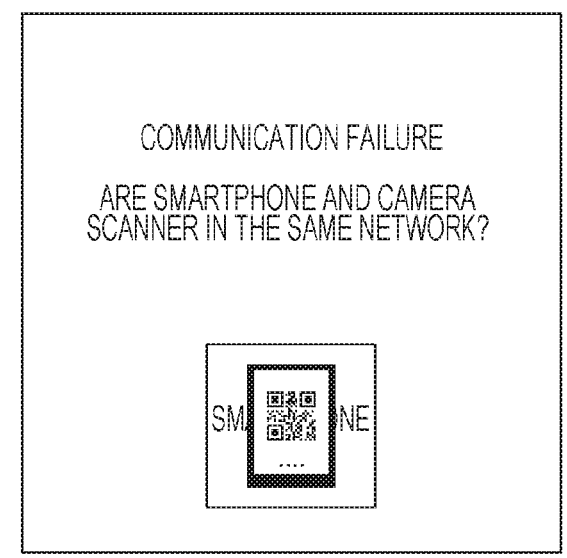

The smartphone is placed on the document stand 204 in the state of FIG. 8B.

Although the transferred data is photograph data in the example described above, the data is not limited to photograph data, and moving-image data or text data may be transferred. Furthermore, although the operation of pressing the smartphone data display button 1102 may be required on the camera scanner 101 side, this operation may be omitted. The camera scanner 101 may constantly recognize a QR code. By this, one of the operations required to be performed by the user described above, that is, the operation indicated by "the smartphone data display button 1102 is pressed in FIG. 8A" is not required.

Second Embodiment

Although the communication between the camera scanner 101 and the single smartphone 106 is described as an example in the first embodiment, communication between a camera scanner 101 and a plurality of smartphones 106 will be described as an example in a second embodiment. Note that the configurations of the camera scanner 101 and the smartphones 106 are the same as those described above, and therefore, illustrations and descriptions thereof are omitted.

The data transfer process according to the second embodiment will be described hereinafter with reference to FIGS. 10A to 10K and FIG. 11.

Figure 10A:
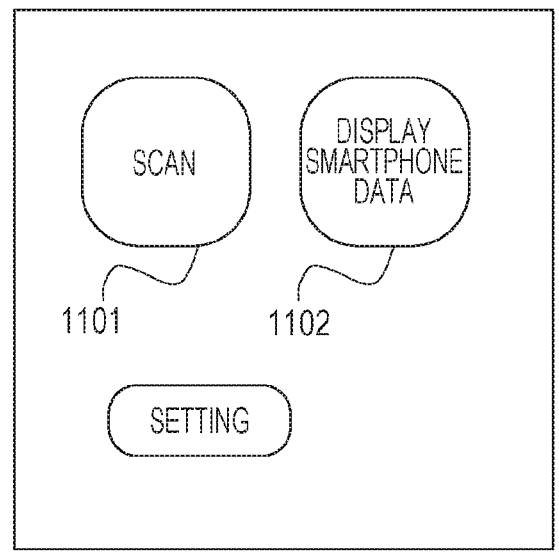
FIGS. 10A to 10K are diagrams illustrating states of a surface of a document stand according to a second embodiment.
Figure 10B:
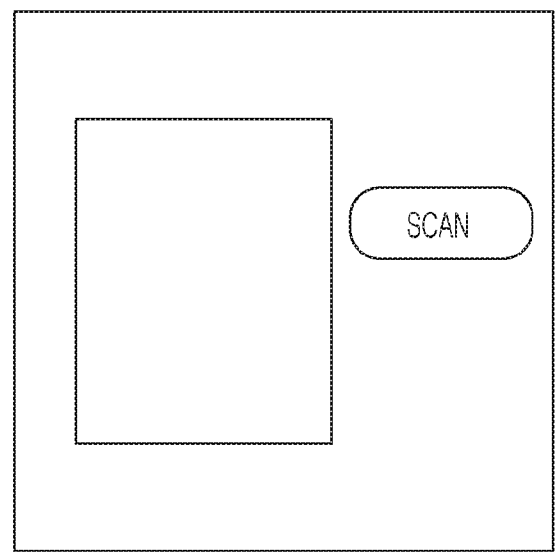

FIGS. 10A to 10K are diagrams illustrating a state of a surface of a document stand 204 of the camera scanner 101 when the data transfer process is performed in the second embodiment. In the second embodiment, a user is not required to press a smartphone data display button 1102 in an initial display screen illustrated in FIG. 10A, which is similar to FIG. 8A described above. It is assumed here That the user presses (selects) the scan button 1101, for example. When the user selects the scan button 1101, the camera scanner 101 activates a scan app and displays a scan app screen, for example, as illustrated in FIG. 10B. Note that the activation of the scan app may not be required in order to realize a data transfer process described below, and the initial screen displayed before the scan button 1101 or the like is selected may be continuously displayed.

Figure 11:
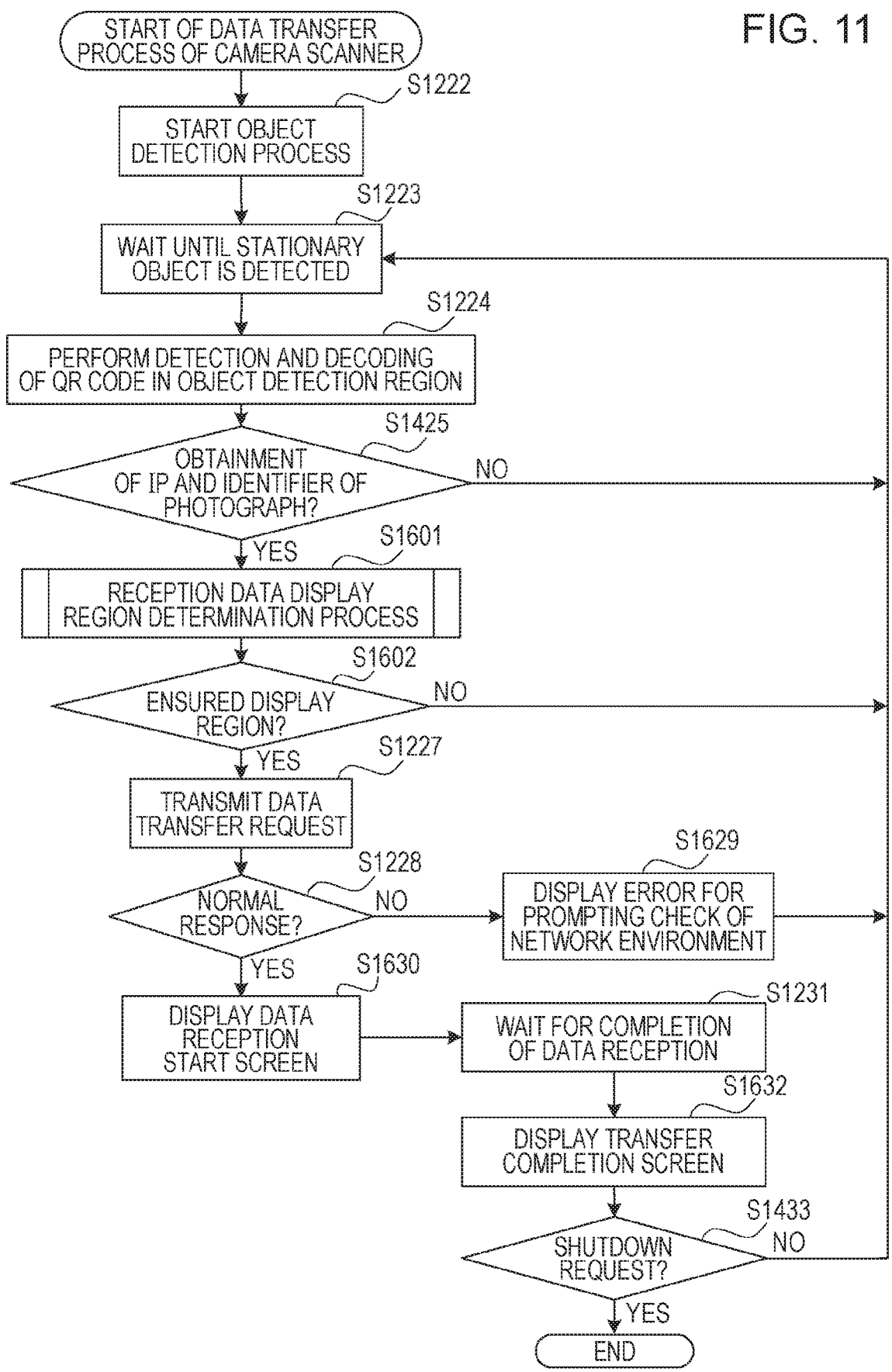
FIG. 11 is a flowchart of a transfer process performed by a camera scanner according to the second embodiment.

FIG. 11 is a flowchart of the data transfer process performed by a camera scanner 101 according to the second embodiment. The flow of the data transfer process of FIG. 11 is executed when a main controller 402 of the camera scanner 101 controls various units and is started when activation of the camera scanner 101 is completed. Note that, in the flowchart of FIG. 11, the processes the same as those of FIG. 9B described above are denoted by reference numerals the same as those of FIG. 9B, and descriptions thereof are omitted. Furthermore, processes performed by a smartphone 106 are the same as those described in the first embodiment, and therefore, descriptions thereof are also omitted.

In a case of the flowchart of FIG. 11, after S1222, the main controller 402 proceeds to S1223, and then to S1224. After S1224, the main controller 402 proceeds to S1425.

In S1425, the main controller 402 determines whether data of a format "<identifier of photograph>:<IP address>" (text data) has been obtained as a result of decoding a QR code in S1224. When the determination is affirmative (YES) in S1425, the main controller 402 proceeds to S1601. On the other hand, when the determination is negative (NO) in S1425, the main controller 402 returns to S1223. Furthermore, also in a case where the data of the format "<identifier of photograph>:<IP address>" is not obtained in S1245 because no QR code is detected in S1224, the main controller 402 returns to S1223. Although the error display is performed in S1225 when the data of the format "<identifier of photograph>:<IP address>" is not obtained according to the foregoing first embodiment, the error display is not performed in the second embodiment. This is because, if the error display is performed, an error is constantly displayed in a case where an object other than smartphones is placed, such as a case where a paper document is to be simply scanned, for example.

In S1601, the main controller 402 performs a reception data display region determination process, which is described below. The reception data display region determination process determines a reception data display region for displaying data or a message associated with the smartphone 106 placed on the document stand 204. The reception data display region is represented as rectangle regions denoted by dotted lines in FIGS. 10D to 10K (a reception data display region 1501 of FIG. 10D, for example). After S1601, the main controller 402 proceeds to S1602.

In S1602, the main controller 402 determines whether the reception data display region has been ensured in S1601. When the determination is negative in S1602 (NO), the main controller 402 returns to S1223. On the other hand, when the determination is affirmative in S1602 (YES), the main controller 402 proceeds to S1227.

Thereafter, the process proceeds until S1228 of FIG. 11, and when it is determined that a response "ACK" has been supplied from the smartphone 106 in S1228 (YES), the main controller 402 proceeds to S1630. On the other hand, when it is determined that a response "ACK" has not been supplied from the smartphone 106 in S1228 (NO), the main controller 402 proceeds to S1629.

In S1629, the main controller 402 displays an error screen that prompts the user to check a network environment in the reception data display region obtained in S1601. Thereafter, the main controller 402 returns to S1223.

Figure 10C:
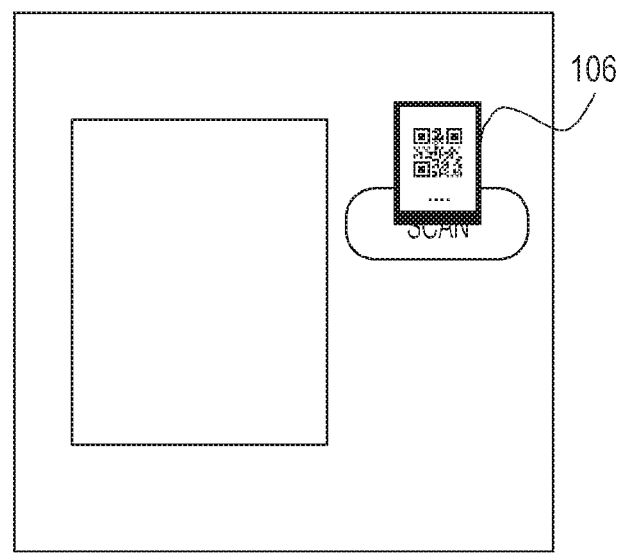
Figure 10D:
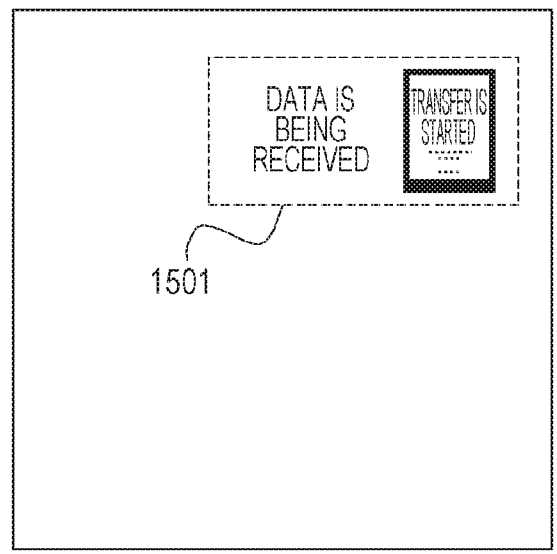

On the other hand, in S1630, the main controller 402 displays a data reception start message that notifies a user of a reception of data in the reception data display region 1501 determined in S1601, for example, as illustrated in FIG. 10D. Furthermore, when an end button 1104 is being displayed, the main controller 402 does not display the data reception start message. After S1630, the main controller 402 proceeds to S1231.

In S1231, when receiving a notification indicating that the data transfer is completed from the data transfer processing unit 420, the main controller 402 proceeds to S1632.

In S1632, the main controller 402 projects and displays a data transfer completion screen that notifies the user of the completion of data transfer. Here, the main controller 402 projects and displays the screen such that a direction of the QR code obtained in S1224 matches a direction of the displayed photograph. In this way, the photograph is displayed in an appropriate direction when viewed from the user who placed the smartphone 106. Furthermore, in addition to the display of the received photograph, the end button 1104 is disposed on this screen so as to accept an end of display. As with the case of the first embodiment, the end button 1104 is selected when the user instructs an end of the data transfer completion screen. When the end button 1104 is pressed, the main controller 402 changes a screen so that the screen displayed before the data reception start screen displayed in S1230 is displayed. Furthermore, the main controller 402 clears all set reception data display regions. Note that end buttons 1104 are not disposed for different reception data display regions, but only one end button 1104 is displayed for the entire screen. After S1632, the main controller 402 proceeds to S1433.

In S1433, the main controller 402 determines whether the user has requested shutdown of an entire system. When the determination is affirmative in S1433 (YES), the main controller 402 terminates the process in the flowchart of FIG. 11 and executes the shutdown of the system. On the other hand, when the determination is negative in S1433 (NO), the main controller 402 returns to S1223. Specifically, the data transfer process of the second embodiment is repeatedly performed until the entire system is shut down.

Note that, although all the processes are performed in synchronization with one another for simplicity in this embodiment, a long period of time may be required for a reception of data in practice, and therefore, the processes in S1231 and S1632 may not be synchronized with each other so that data receptions from a plurality of smartphones are simultaneously performed. Specifically, after the process in S1630 is executed, the process in S1433 is entered, and simultaneously, the processes in S1231 and S1632 are executed in turn in an asynchronous manner. Furthermore, when a plurality of objects are simultaneously detected in S1223, the process in S1224 onwards is performed for each object region.

Hereinafter, the relationships between the processes in the steps in the data transfer process according to the second embodiment and the state of the document stand 204 will be described.

First, it is assumed that a first smartphone 106 is placed on the document stand 204 as illustrated in FIG. 10C. In the second embodiment, a state of the document stand 204 at a time when the process in S1630 of FIG. 11 is performed is illustrated in FIG. 10D. As illustrated in FIG. 10D, information associated with the first smartphone 106 is displayed in the reception data display region 1501. Furthermore, a state of the document stand 204 at a time when the process in S1629 of FIG. 11 is performed is illustrated in FIG. 10K.

Figure 10E:
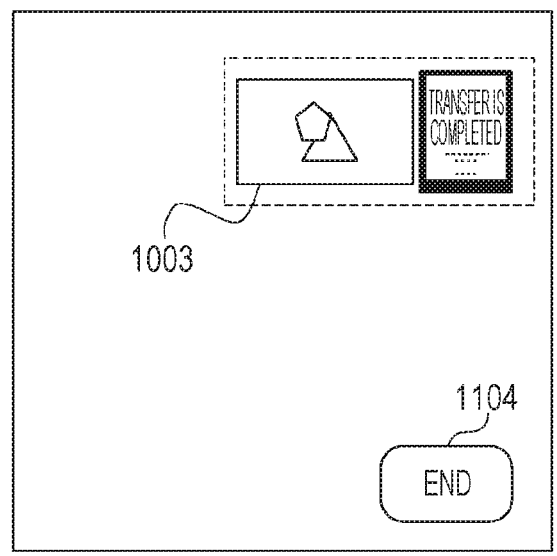
Figure 10F:
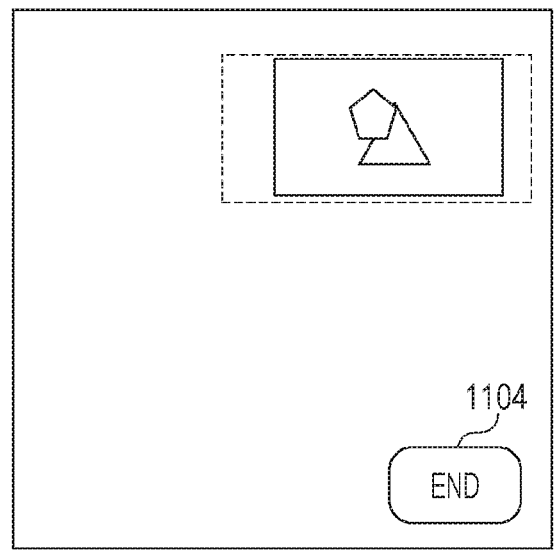

Furthermore, a state of the document stand 204 at a time when the process in S1632 of FIG. 11 is performed is illustrated in FIG. 10E in a case where the main controller 402 has not received an object removal notification from an object detection unit 410 before the process in S1632 is performed. On the other hand, a state of the document stand 204 in a case where the main controller 402 has received an object removal notification from the object detection unit 410 is illustrated in FIG. 10F.

Figure 10G:
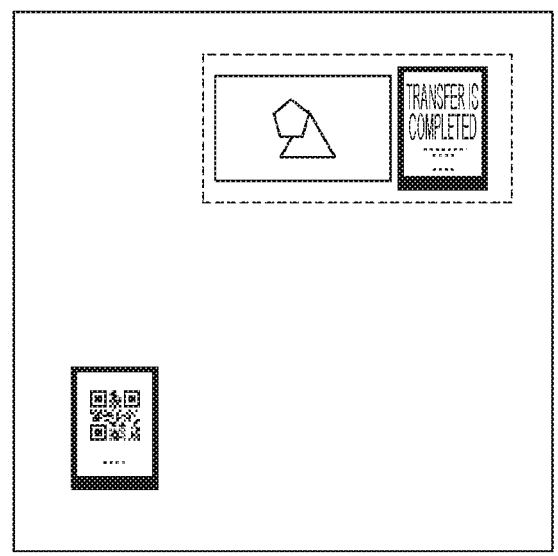
Figure 10H:
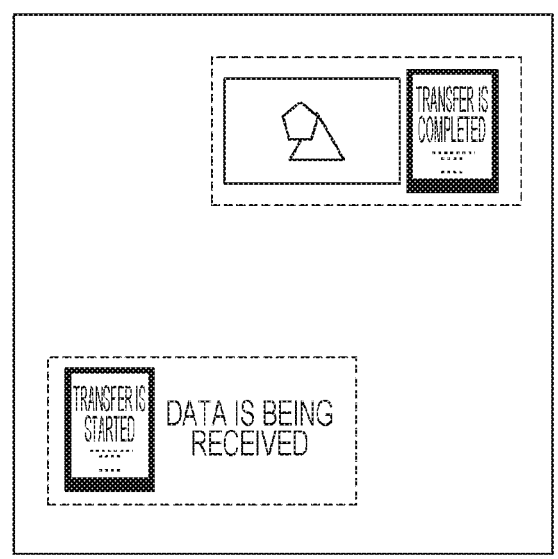

Subsequently, it is assumed that a second smartphone is placed on the document stand 204, for example, as illustrated in FIG. 10G in S1223 of FIG. 11, while the first smartphone 106 is still placed on the document stand 204. In this case, a state of the document stand 204 at a time when the process in S1630 of FIG. 11 is performed for the second time is illustrated in FIG. 10H.

Figure 10I:
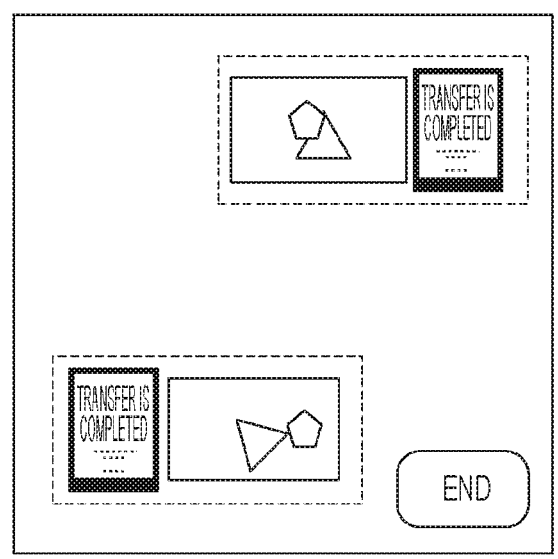
Figure 10J:
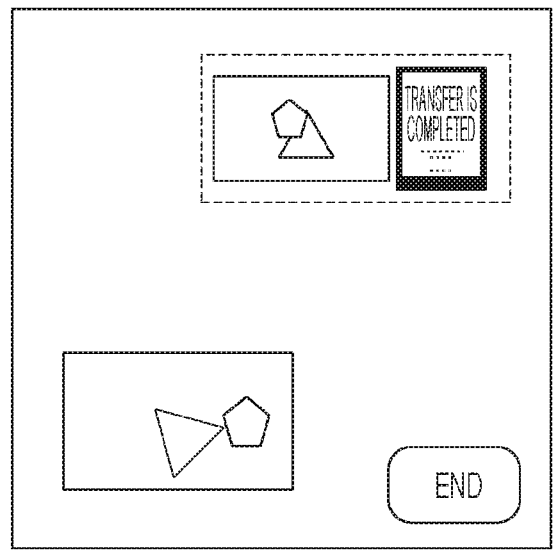
Figure 10K:

Furthermore, a state of the document stand 204 at a time when the process in S1632 is performed for the second time in a case where the main controller 402 has not received an object removal notification from the object detection unit 410 before the process in S1632 is performed is illustrated in FIG. 10I. On the other hand, a state of the document stand 204 in a case where the main controller 402 has received an object removal notification from the object detection unit 410 is illustrated in FIG. 10J.

Figure 12:
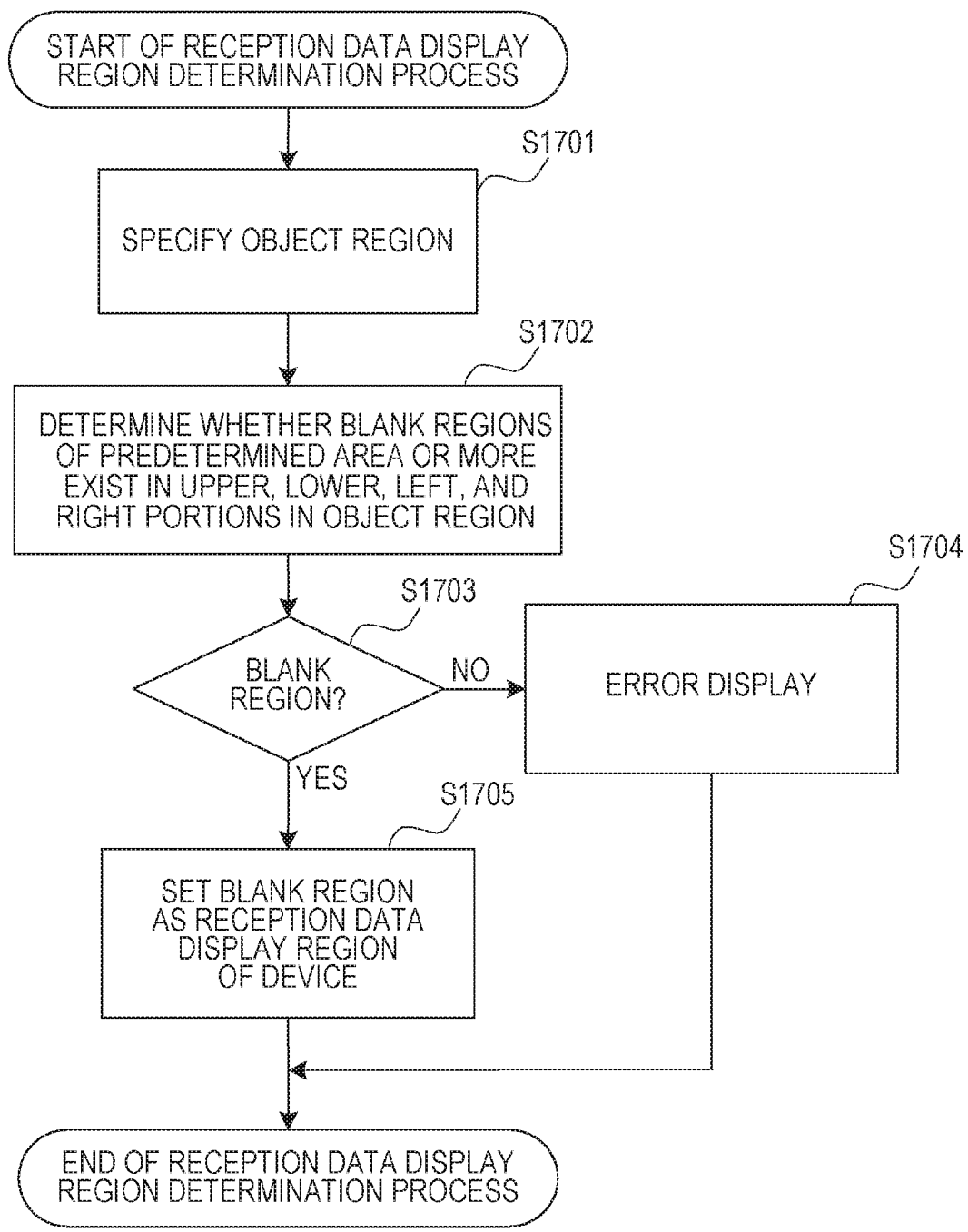
FIG. 12 is a flowchart of a reception data display region determination process.

FIG. 12 is a flowchart of the reception data display region determination process in S1601 of FIG. 11 illustrated in detail.

In S1701 of FIG. 12, the main controller 402 obtains object placement region information. After S1701, the main controller 402 proceeds to S1702.

In S1702, the main controller 402 sets rectangle regions having a predetermined size which accommodate an object placement region, that is, a rectangle region having a longer side extending upward, a rectangle region having a longer side extending rightward, a rectangle region having a longer side extending downward, and a rectangle region having a longer side extending leftward, relative to the object placement region serving as a reference. Then the main controller 402 determines whether each of the rectangle regions protrudes outside the entire display region and whether each of the rectangle regions overlaps with another reception data display region that has been set so as to determine whether a blank region exists. After S1702, the main controller 402 proceeds to S1703.

In S1703, the main controller 402 determines whether a blank region exists. When the determination is negative in S1703 (NO), the main controller 402 proceeds to S1704, and otherwise (YES), the main controller 402 proceeds to S1705.

In S1704, the main controller 402 displays an error message indicating that an image of data which has been transferred may not be displayed in a position where the object (the smartphone 106) is placed by the user, and thereafter, the main controller 402 terminates the process in FIG. 12 and proceeds to S1602 of FIG. 11.

On the other hand, in S1705, the main controller 402 sets the rectangle region obtained in S1702 as a reception data display region of the placed object (the smartphone 106), and thereafter, the main controller 402 terminates the flowchart of FIG. 12 and proceeds to S1602 of FIG. 11.

FIGS. 13A to 13E are diagrams illustrating states of the document stand 204 when the reception data display region determination process illustrated in FIG. 12 is executed. In FIGS. 13A to 13E, rectangle regions surrounded by dotted lines indicate reception data display regions.

Figure 13A:
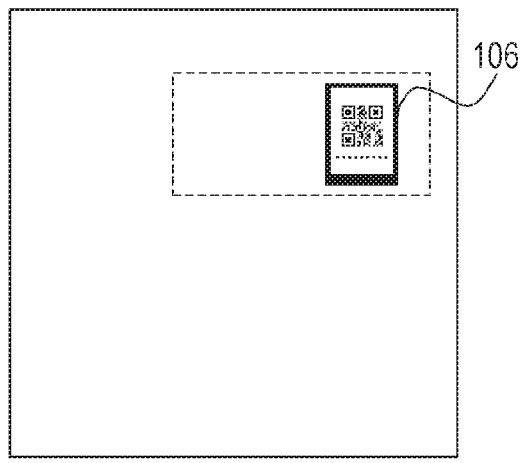
FIGS. 13A to 13E are diagrams illustrating the determination of reception data display regions.

FIG. 13A is a diagram illustrating a state in which a first smartphone 106 is placed on the document stand 204. In an example of FIG. 13A, since a rectangle region having a longer side extending leftward relative to the smartphone 106 may be set, the rectangle region which extending leftward is set as the reception data display region.

Figure 13B:
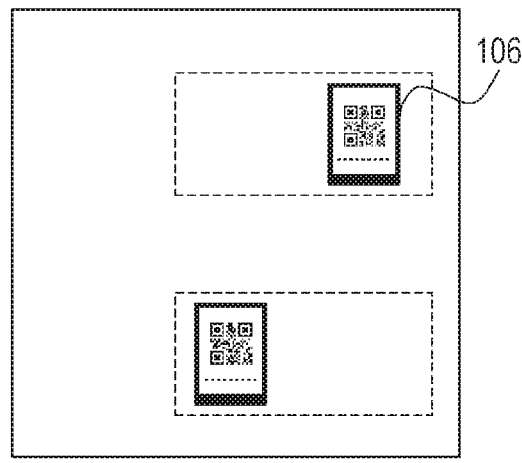
Figure 13C:
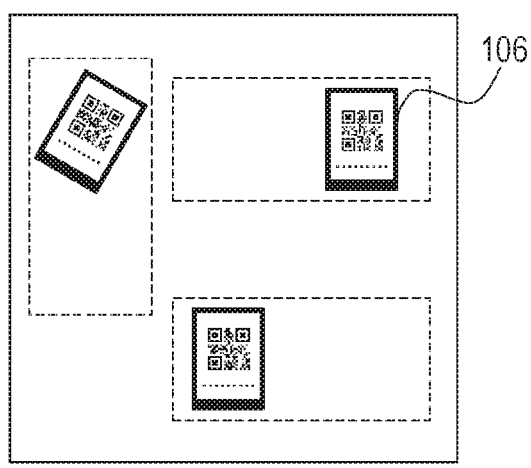
Figure 13D:
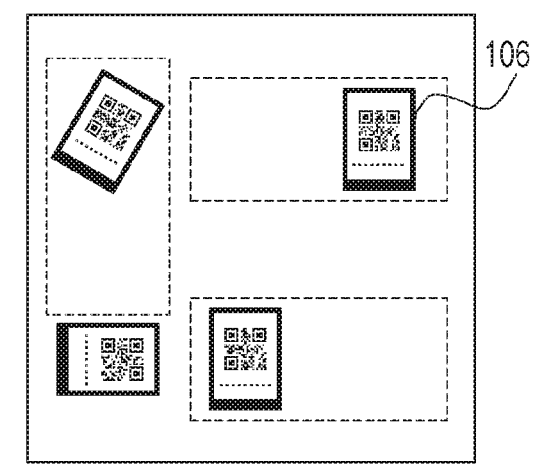
Figure 13E:
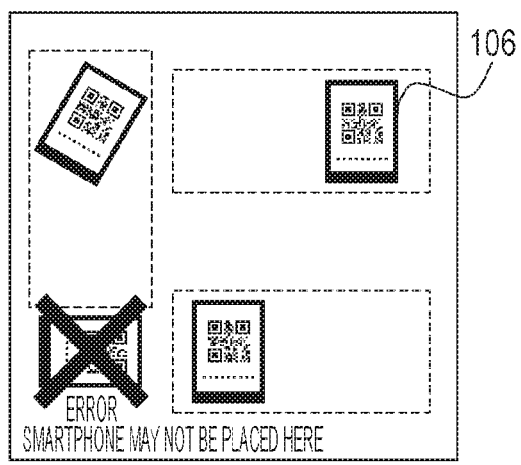

FIG. 13B is a diagram illustrating a state in which a second smartphone is placed on the document stand 204. In an example of FIG. 13B, a rectangle region having a longer side extending leftward, upward, or downward may not be set, and therefore, a rectangle region extending rightward is set as the reception data display region. FIG. 13C is a diagram illustrating a state in which a third smartphone is placed on the document stand 204. In an example of FIG. 13C, since a rectangle region having a longer side extending leftward, upward, or rightward may not be set, and therefore, a rectangle region which extending downward is set as the reception data display region. FIG. 13D is a diagram illustrating a state in which a fourth smartphone is placed on the document stand 204. In an example of FIG. 13D, since a rectangle region having a longer side extending leftward, upward, rightward, or downward may not be set, and therefore, an error message is displayed as illustrated in. FIG. 13E.

As described above, according to the second embodiment, even in a case where photograph data is transferred from the plurality of smartphones 106 to the camera scanner 101, the user may perform data transfer from the smartphones 106 to the camera scanner 101 by a smaller number of operations. Furthermore, according to the second embodiment, data transferred from each of the smartphones 106 is displayed in the vicinity of a corresponding one of the smartphones 106 placed on the document stand 204 that has transferred the data. Accordingly, the users of the smartphones 106 may check the transferred data on the document stand 204 without confusion. Note that, although the transferred photographs are displayed in the vicinity of the corresponding smartphones 106 that have transferred data of the photographs in this embodiment, the relationships between the photographs and the smartphones 106 may be emphasized by connecting the smartphones 106 to the photographs by images of lines, for example.

As described above, according to the first and second embodiments, data included in a mobile terminal, such as a tablet device or a smartphone, may be immediately transferred to a camera scanner and displayed in a large screen. Furthermore, the series of operations for the data transfer includes an operation of placing the device of a transfer source on a document stand of the camera scanner, which is a transfer destination, and therefore, the data transfer is realized by an operation that is simple for a user. Therefore, according to the first and second embodiments, efficiency of operations using the camera scanner may be improved.

Other Embodiments

Some embodiment(s) can be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure describes exemplary embodiments, it is to be understood that the embodiments are not limited to the disclosed exemplary embodiments. Also, the scope of the following claims is to be accorded the broadest interpretation so as to encompass all such modifications and equivalent structures and functions.

This application claims priority to Japanese Patent Application No. 2016-218954 filed Nov. 9, 2016, which is hereby incorporated by reference in its entirety.

What is claimed is:

1. An image processing system in which a mobile terminal and an image processing apparatus are able to perform wireless communication with each other,
the mobile terminal comprising:
a display capable of displaying information;
a storage capable of storing image data; and
a controller capable of causing the display to display an encoded image which is obtained by encoding both of connection information and identification information, wherein the connection information is information for specifying the mobile terminal, and wherein the identification information is information for identifying image data that is selected from images stored in the mobile terminal by a user of the mobile terminal; and
the image processing apparatus comprising:
a projector capable of projecting an image onto a projection plane;
an imaging unit capable of capturing the projection plane to obtain a captured image; and
at least one controller configured to perform processing, including
acquiring, from the captured image obtained by the imaging unit, the encoded image displayed on the mobile terminal placed on the projection plane,
decoding the acquired encoded image to obtain both of the connection information and the identification information,
requesting the mobile terminal specified with the decoded connection information, to transfer the image data identified by the decoded identification information,
receiving, from the mobile terminal, the image data identified by the decoded identification information, and
causing the projector to project an image based on the received image data,
wherein the projector of the image processing apparatus is capable of projecting the image based on the received image data in a state in which the mobile terminal has been removed from the projection plane after acquisition of the encoded image.

2. The information processing system according to claim 1, wherein the projector of the image processing apparatus projects, onto the projection plane, information about an area where the mobile terminal is to be placed.

3. The information processing system according to claim 1, wherein the projector of the image processing apparatus projects, onto the projection plane, an object for giving an instruction for ending the projection of the image based on the received image data.

4. The information processing system according to claim 1, wherein the projector of the image processing apparatus projects, onto the projection plane, information that indicates a status of communication with the mobile terminal when receiving the image data.

5. The information processing system according to claim 1, wherein the projector of the image processing apparatus projects the image based on the received image data in such a way as not to overlap a position where the mobile terminal is placed.

6. The information processing system according to claim 1, wherein the projector of the image processing apparatus projects the image based on the received image data at a position based on a read position of the encoded image.

7. The information processing system according to claim 1, wherein the image processing apparatus performs first projection processing based on the received image data in a state in which the mobile terminal is placed on the projection plane and performs second projection processing based on the received image data in a state in which the mobile terminal has been removed from the projection plane.

8. The information processing system according to claim 7, wherein a projection size of the received image data projected in the second projection processing is larger than a projection size of the received image data projected in the first projection processing.

9. The information processing system according to claim 1, wherein the image processing apparatus performs error notification based on a placement, in a predetermined situation, of the mobile terminal that displays the encoded image.

10. The image processing system according to claim 9, wherein the predetermined situation is that an area for further projecting another image is not available on the projection plane.

11. The information processing system according to claim 1, wherein the image processing apparatus makes an area for projecting the image based on the received image data available in response to a placement, on the projection plane, of the mobile terminal that displays the encoded image.

12. The information processing system according to claim 1, wherein, after receiving the request from the image processing apparatus, the mobile terminal executes screen switching automatically from a screen with the encoded image to a screen without the encoded image.

13. The information processing system according to claim 12,
wherein the screen without the encoded image is a screen with a message that the mobile terminal be removed from the projection plane.

14. The image processing system according to claim 1, wherein the connection information includes an IP address of the mobile terminal.

15. The image processing system according to claim 1, wherein the encoded image is in a barcode format.

16. The image processing system according to claim 15, wherein the barcode format is a QR code format.

17. An image processing apparatus capable of performing wireless communication with a mobile terminal, the image processing apparatus comprising:
a projector capable of projecting an image onto a projection plane;
an imaging unit capable of capturing the projection plane to obtain a captured image; and
at least one controller configured to perform processing, including
acquiring, from the captured image obtained by the imaging unit, an encoded image displayed on the mobile terminal placed on the projection plane,
decoding the acquired encoded image to obtain both of connection information and identification information,
requesting the mobile terminal specified with the decoded connection information to transfer image data identified by the decoded identification information,
receiving, from the mobile terminal, the image data identified by the decoded identification information, and
causing the projector to project an image based on the received image data,
wherein the projector is capable of projecting the image based on the received image data in a state in which the mobile terminal has been removed from the projection plane after acquisition of the encoded image.

18. A method for controlling an image processing apparatus capable of performing wireless communication with a mobile terminal and including a projector capable of projecting an image onto a projection plane and an imaging unit capable of capturing the projection plane to obtain a captured image, the method comprising:
acquiring, from the captured image obtained by the imaging unit, an encoded image displayed on the mobile terminal placed on the projection plane;
decoding the acquired encoded image to obtain both of connection information and identification information;
requesting the mobile terminal specified with the decoded connection information to transfer image data identified by the decoded identification information;
receiving, from the mobile terminal, the image data identified by the decoded identification information; and
causing the projector to project an image based on the received image data,
wherein the projector is capable of projecting the image based on the received image data in a state in which the mobile terminal has been removed from the projection plane after acquisition of the encoded image.

19. An image processing system in which a mobile terminal and an image processing apparatus are able to perform wireless communication with each other,
the mobile terminal comprising:
a display capable of displaying information;
a storage capable of storing image data; and
a controller capable of causing the display to display an encoded image which is obtained by encoding both of connection information and identification information, wherein the connection information is information for specifying the mobile terminal, and wherein the identification information is information for identifying image data that is selected from images stored in the mobile terminal by a user of the mobile terminal; and
the image processing apparatus comprising:
a projector capable of projecting an image onto a projection plane;
an imaging unit capable of capturing the projection plane to obtain a captured image; and
at least one controller configured to perform processing, including
acquiring, from the captured image obtained by the imaging unit, the encoded image displayed on the mobile terminal placed on the projection plane,
decoding the acquired encoded image to obtain both of the connection information and the identification information, requesting the mobile terminal specified with the decoded connection information, to transfer the image data identified by the decoded identification information, receiving, from the mobile terminal, the image data identified by the decoded identification information, and causing the projector to project an image based on the received image data, wherein the projector is capable of projecting the image based on the received image data in a state in which the mobile terminal on the projection plane does not display the encoded image after receiving the request from the image processing apparatus.

20. An image processing apparatus capable of performing wireless communication with an electronic terminal, the image processing apparatus comprising:

a projector capable of projecting an image onto a projection plane;

an imaging unit capable of capturing the projection plane to obtain a captured image; and at least one controller configured to perform processing, including acquiring, from the captured image obtained by the imaging unit, an encoded image displayed on the electronic terminal placed on the document stand, decoding the acquired encoded image to obtain both of connection information and identification information, requesting the mobile terminal specified with the decoded connection information, to transfer image data identified by the decoded identification information, receiving, from the mobile terminal, the image data identified by the decoded identification information, and causing the projector to project an image based on the received image data, wherein the projector is capable of projecting the image based on the received image data in a state in which the mobile terminal does not display the encoded image after receiving the request from the image processing apparatus.

* * * * *